United States Patent [19]
Ross

[11] 4,442,490
[45] Apr. 10, 1984

[54] AIRCRAFT PITCH STABILIZATION APPARATUS

[75] Inventor: James E. Ross, Mineral Wells, Tex.

[73] Assignee: S-Tec Corporation, Fort Walters, Tex.

[21] Appl. No.: 468,803

[22] Filed: Feb. 28, 1983

Related U.S. Application Data

[63] Continuation of Ser. No. 191,263, Sep. 26, 1980, abandoned.

[51] Int. Cl.³ .............................................. G06G 7/78
[52] U.S. Cl. ................................... 364/433; 244/180;
    244/181; 318/584; 364/429; 364/434
[58] Field of Search ........................ 364/429, 433, 434;
    340/27 SS, 27 AT; 318/580, 583, 584; 244/177,
    180, 181, 186, 188

[56] References Cited

U.S. PATENT DOCUMENTS

| | | | |
|---|---|---|---|
| 2,525,900 | 10/1950 | Hammond | 244/77 |
| 2,650,046 | 8/1953 | Vanderlip | 244/17.13 |
| 2,651,015 | 9/1953 | Meredith | 318/489 |
| 2,790,946 | 5/1957 | Yates | 318/489 |
| 2,950,431 | 8/1960 | Wright | 318/489 |
| 3,077,557 | 2/1963 | Joline | 318/489 |
| 3,240,446 | 3/1966 | Miller | 244/77 |
| 3,295,796 | 1/1967 | Gaylor | 318/583 X |
| 3,346,217 | 10/1967 | Younkin | 244/78 |
| 3,482,805 | 12/1969 | Knemeyer | 244/180 |
| 3,510,092 | 5/1970 | Hendrick et al. | 244/180 |
| 3,617,848 | 11/1971 | Friday | 318/584 |
| 3,638,092 | 1/1972 | Kammerer | 318/584 |
| 3,800,127 | 3/1974 | Knemeyer | 364/433 |
| 3,862,717 | 1/1975 | Lehfeldt | 364/424 |
| 3,887,148 | 6/1975 | Devlin | 364/429 X |
| 3,899,661 | 8/1975 | Lehfeldt | 364/433 |
| 3,921,941 | 11/1975 | Lehfeldt | 244/77 F |
| 3,929,019 | 12/1975 | Younkin | 73/398 C |
| 3,936,715 | 2/1976 | Nixon et al. | 318/580 |
| 3,940,673 | 2/1976 | Darlington | 318/584 |
| 3,940,990 | 3/1976 | Younkin | 73/387 |
| 3,945,593 | 3/1976 | Schanzer | 244/77 D |
| 3,947,808 | 3/1976 | Bateman | 244/180 X |
| 3,953,847 | 4/1976 | Younkin et al. | 340/347 AD |
| 3,980,258 | 9/1976 | Simeon | 244/186 X |
| 3,994,455 | 11/1976 | Simpson | 364/429 X |
| 4,016,565 | 4/1977 | Walker | 343/7 TA |
| 4,094,480 | 6/1978 | Nixon | 244/180 |
| 4,114,842 | 9/1978 | Hofferber et al. | 364/433 X |

Primary Examiner—Jerry Smith
Attorney, Agent, or Firm—Pennie & Edmonds

[57] ABSTRACT

An automatic aircraft pitch axis flight stabilization system which does not require the use of a gyroscope is described. Stability signals are derived from an altitude signal responsive to atmospheric pressure. Means responsive to rate of change of altitude produces a vertical rate signal and means responsive to rate of change of vertical rate produces a vertical acceleration signal. The vertical speed signal is combined with a command signal which causes the aircraft to fly at constant altitude, at constant vertical speed, or to descend along a glide slope, and the vertical acceleration signal to produce a control signal which operates a means, such as a servomechanism for positioning the vertical control surfaces of the aircraft.

43 Claims, 11 Drawing Figures

AIRCRAFT PITCH STABILIZATION APPARATUS

This application is a continuation of application Ser. No. 191,263, filed 9/26/80 and now abandoned.

TECHNICAL FIELD

This invention relates to aircraft flight control and stabilization systems. More particularly it relates to a pitch axis automatic flight stabilization system which dispenses with the need to use a vertical or rate gyroscope to provide pitch axis orientation information.

BACKGROUND ART

Many aircraft pitch axis stabilization systems use a vertical or rate gyroscope to provide signals responsive to the attitude or rate of change of the attitude of the aircraft. These signals are often used in conjunction with altitude error, or derived vertical speed signals, to provide control signals for operating pitch control surface positioning means. It is possible, utilizing such positioning means, to develop systems which will fly an aircraft at constant altitude, or provide comfortable closure on a preselected altitude without significant overshoot or hunting.

The dependence of such systems on gyroscopes greatly increases their cost and reduces their reliability. Often because of size or weight limitations such systems are suitable only for large expensive aircraft and not the general aviation field, where cost and weight are important considerations.

Systems as outlined above have improved to a certain extent, at least in the area of altitude hold systems, with the use of pressure transducers to provide altitude reference signals, and the use of digital hold circuits to store predetermined values of these signals. The versatility of operation of these systems, however, has been limited.

Mechanical accelerometers have occasionally been used to provide signals to aid in pitch axis stabilization. One difficulty associated with such apparatus is the fact that the accelerometer responds to acceleration in directions not associated with vertical motion of the aircraft during certain maneuvers, leading to pitch axis instability. Another difficulty is the great expense generally associated with the installation and use of such accelerometers.

OBJECTS OF THE INVENTION

It is an object of this invention to provide an efficient, reliable aircraft pitch stabilization apparatus which will eliminate any use of vertical or rate gyroscopes or mechanical accelerometers.

Another object is to provide an aircraft pitch stabilization apparatus which uses an acceleration signal, derived from a signal responsive to rate of change of altitude, as a basic stability signal to oppose spurious or excessive pitch axis rotation of the aircraft.

Yet another object of this invention is to provide an aircraft pitch axis stabilization apparatus which, because it requires virtually no connections to other aircraft instrumentation, dispenses with the need for the costly replacement of instruments, such as altimeters, with pitch stabilization system compatible components to supply flight information.

An additional object of this invention is to provide an aircraft pitch stabilization apparatus which allows the pilot to select from a variety of vertical command signals for controlling the aircraft.

A further object of this invention is to provide an aircraft pitch stabilization apparatus which provides constant dynamic performance regardless of altitude.

Yet another object of this invention is to provide an aircraft pitch stabilization apparatus which is continuously synchronized to aircraft altitude to provide a virtually instantaneously derived altitude reference voltage when altitude hold is desired.

An additional object of this invention is to provide a pitch stabilization apparatus which will automatically disengage in response to excessive vertical acceleration, while permitting the servomechanism associated with the apparatus to provide high authority control forces to the pitch control surfaces of the aircraft. The apparatus which is provided does not require a mechanical slip clutch to limit the authority of these forces. A slip clutch which transmits reasonably strong forces is used, however, to permit the pilot to override the servomechanism, rather than to limit the authority of the control forces.

DISCLOSURE OF THE INVENTION

The present invention overcomes the difficulties in the prior art by deriving stability signals from means for producing an altitude signal responsive to atmospheric pressure. Means responsive to rate of change of altitude produce vertical rate and means responsive to rate of change of vertical rate produce vertical acceleration signals, both of which are derived from the altitude signal. The derived vertical acceleration signal serves as a basic stability component, which eliminates the need for a vertical or rate gyro by limiting the rate of pitch rotation of the aircraft. The vertical rate signal provides a measure of the rate of closure of the aircraft in following a command signal thus enhancing smooth, stable dynamic performance. The command signal may be selected to direct the aircraft to fly at constant altitude, at constant vertical rate, or to descend following a standard glide slope pattern. The use of the vertical rate and acceleration signals results in smooth, controlled changes in aircraft pitch which contributes materially to passenger comfort.

The command signal, vertical rate signal and the acceleration signal are combined to produce a control signal. The control signal operates a device, such as a servomechanism, for positioning the control surfaces of the aircraft. The pitch stabiliaztion system of this invention, by obtaining flight information from a single pressure transducer, is of very low cost and high reliability. No maintenance of mechanical parts is necessary, as expensive troublesome gyros, and their support equipment, are eliminated. Linearization of the altitude signal results in constant dynamic performance regardless of altitude. Limitation of the rate of pitch rotation by the acceleration signal, rather than by angle sensing means, insures that changes in aircraft speed do not change the accelerations felt by the passengers. Maneuvers such as turns do not affect the basic pitch stabiity of the aircraft, as accelerometers are not used.

The use of a single pressure transducer eliminates the need for replacing existing aircraft instrumentation, such as altimeters, with pitch stabilization system compatible components to supply flight information. No connections to other aircraft instruments are necessary except a single logic line which may be required for safety considerations to prohibit the engagement of a pitch axis stabilization system before the engagement of an existing roll axis stabilization system.

In accordance with a further provision, the system of the invention utilizes a means for storing the amplitude of the altitude signal such as a digital sample and hold circuit with an up/down counter which constantly produces an output substantially equal to the latest value of that signal. When it is desired to use the system to hold the aircraft at constant altitude, this value, already existing, is inhibited from changing. There is thus no delay associated with waiting for a storage means to synchronize a stored value to a particular altitude signal amplitude. Altitude stability is available immediately upon engagement. When used to maintain constant aircraft altitude, the stored amplitude is combined with the altitude signal, which varies with atmospheric pressure, to produce an altitude deviation signal. This altitude deviation signal is then the command signal which is combined with the vertical rate signal to produce an error signal, as described above. This error signal is combined with the acceleration signal to produce a control signal for controlling a means, such as a servomechanism, for positioning the aircraft's vertical control surfaces.

An additional feature of the invention allows the pilot to modify the altitude of the aircraft slightly without the need to disengage the altitude hold function by use of an altitude modifier. The altitude modifier injects a voltage into the means used to combine the stored amplitude and the actual altitude signal. Aircraft altitude is modified in response to this voltage and held at this new altitude. This altitude modifying voltage may be generated by means of an up/down counter which counts clock pulses from a low frequency clock in response to an up/down command. The command may be present for a time interval which is manually determined by the pilot. Thus the length of time that an up or down switch is depressed will determine up to the limit of the counter, or scaling of the voltage the magnitude and direction of the altitude modification.

Another feature of the invention permits a pilot to fly the aircraft at constant vertical speed, or in other words maintain a constant rate of climb or descent. Storage means, such as a digital sample and hold with an up/down counter, stores the amplitude of the vertical rate signal at a desired vertical rate. This stored voltage then is utilized as the command signal that is combined with the aircraft's actual vertical rate signal (which varies with rate of change of altitude) to produce an error signal. The error signal is combined with the acceleration signal, which is responsive to rate of change of the vertical rate signal, to produce a control signal. Means responsive to this control signal, such as a servomechanism, then control the position of the pitch control surfaces of the aircraft.

The count stored in the digital sample and hold can be manually modified in response to an up/down command which causes the counter to count pulses from a low frequency clock, in a manner similar to that described above for modifying altitude. In this case the pilot can modify the vertical rate, or in other words the rate of climb or descent of the aircraft increasing the vertical rate positively, proportionately to the time that an "up" switch is held closed, and decreasing the rate of climb negatively (or causing a rate of descent) proportionately to the amount of time that a "down" switch is depressed.

An additional feature of the invention is a stall warning system which indicates when the error signal resulting from combining the stored vertical rate data with the aircraft's actual vertical rate signal is above a predetermined value for longer than a predetermined time. This system informs the pilot that it is necessary to check his instruments to be sure the engine is producing sufficient power to fly the aircraft at the desired vertical rate, and to take appropriate action when this is not possible.

Yet another feature of this invention allows the pilot to automatically maintain the aircraft's rate of descent on a glide path by controlling the pitch of the aircraft. When used in this mode the apparatus of this invention acquires an isolated glide slope needle position signal from a navigational receiver. This needle position signal is then combined with the vertical rate signal described above to produce an output signal. The output signal is combined with the acceleration signal to produce a control signal. Means responsive to the control signal, such as a servomechanism, then controls the position of the pitch control surfaces of the aircraft. To permit more precise control of the aircraft, the means for combining vertical rate signal and the needle position signal comprises a means for filtering out long term variations in the vertical rate signal, a summing amplifier for producing a sum of the filtered vertical rate signal and the needle position signal, a rate network for producing a rate signal proportional to rate of change of the sum signal, and means, such as a summing junction, for combining this rate signal and the sum signal to produce the output signal. An additional rate network is provided to produce a second output signal, responsive to the sum signal, of greater authority than the first rate signal but of limited duration. This second output signal is combined with the first output signal and the acceleration signal to produce a control signal, thus allowing precise rapid adjustments of the aircraft's pitch to accurately follow a glide path when the aircraft is close to the ground.

An additional feature of the invention permits disconnecting or rendering ineffective the pitch control apparatus when aircraft acceleration exceeds a predetermined value. Large accelerations are generally indicative of malfunctions, and it is desirable to disengage the system, permitting the pilot to fly the aircraft without fighting the pitch surface positioning means. While a slip clutch may be used, this sometimes has the effect of limiting the necessary application of forces of great authority to the control surfaces by the means (such as a servomechanism), responsive to the control signal from the pitch stabilization apparatus, for controlling the position of the pitch control surfaces.

According to the present invention, the vertical rate signal, responsive to rate of change of altitude, is used to derive an acceleration signal. When the vertical acceleration signal exceeds a preset amplitude, means responsive to such vertical acceleration signals, disengage or render the pitch stabilization apparatus ineffective to control the pitch of the aircraft.

BRIEF DESCRIPTION OF THE DRAWINGS

Further objects and advantages of the invention may be readily ascertained by reference to the following description and appended drawings:

FIG. 10 is a schematic diagram of the disconnect circuit of FIG. 1.

BEST MODE FOR CARRYING OUT THE INVENTION

Figure 1:
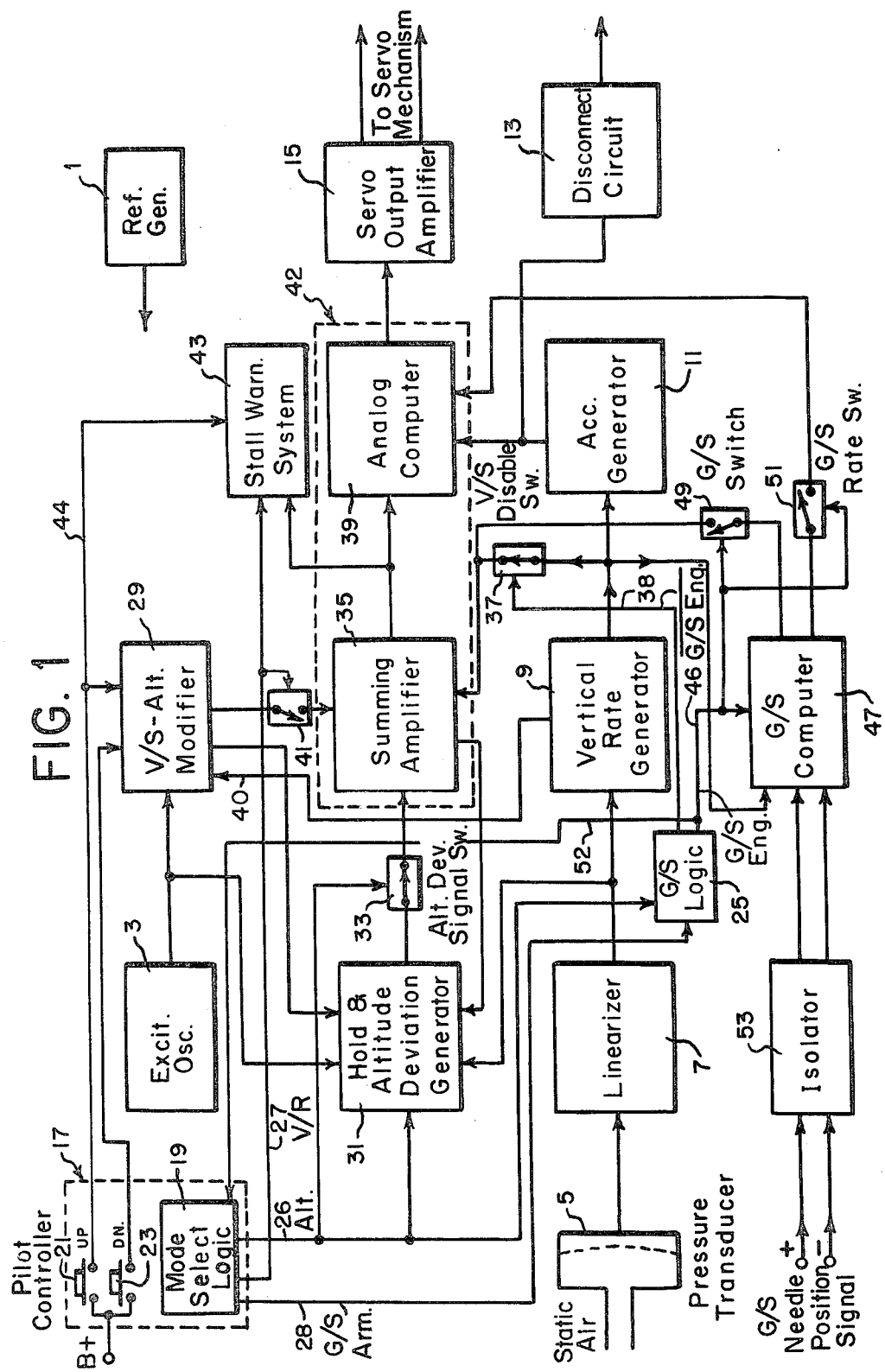
FIG. 1 is a block diagram of a system for providing a control signal to stabilize the pitch of an aircraft.

FIG. 1, the block diagram of the apparatus of the invention, shows all the major circuits needed for the apparatus to stabilize an aircraft's pitch when flying the aircraft at constant altitude, at constant rate of climb or descent, or when descending along a glide path. It also shows some of the switches which are activated to provide the proper signals to the various circuits when a mode of operation is selected. It is understood that not every switch used in the apparatus is shown in FIG. 1. The remainder of the switches are shown in the detailed schematics of the additional figures. When required to facilitate understanding, a switch shown in FIG. 1 may also be shown in one of the other figures. These switches are linear electronic switches of low impedance when actuated by a high logic signal at the control gate. Analog signals are linearly transmitted through the switches.

All of the signal processing and logic devices used in the illustrated embodiment of the invention are preferably of the CMOS variety, thus drawing very little power and which are of high reliability. Other types of devices could be used. These devices are powered by a well regulated 10 volt D.C. power supply, not shown, with its negative side connected to ground, which is generally available from the aircraft.

Since operational amplifiers are used to perform signal processing, and the power supply is of only one polarity with respect to ground, zero voltage (or ground) can not be used as a reference voltage for the inputs of the signal processing circuits. It is thus necessary to provide a reference generator 1, which supplies a stable reference voltage to the signal processing circuitry. The distribution of this reference voltage is not shown in FIG. 1, but connection of reference to the various circuits is shown in the other figures, and the reference generator is more fully described below.

An excitation oscillator 3, which supplies an output signal that approximates a square wave in duty cycle, alternating at a fixed frequency between zero and ten volts, is used as a master clock to operate digital counters used in other circuits. Excitation oscillator 3, and its use in the apparatus are more fully described below.

A pressure transducer 5, connected to the aircraft's static air source provides an output signal voltage proportional to pressure. The general requirements and construction of transducer 5, which is well known, are more fully described below, as are the details of the circuits or blocks of FIG. 1 which are described generally in this discussion which pertains to FIG. 1.

In order to provide uniform and adequate dynamic performance of the pitch stabilization systems at any altitude to which the aircraft is flown, linearizer 7 transforms the voltage output of transducer 5, linear with pressure, to a voltage linear with altitude.

Vertical rate generator 9, responsive to the rate of change of the signal from linearizer 7 provides a signal output representative of vertical rate of the aircraft.

Acceleration generator 11, a circuit similar to that of vertical rate generator 9, is responsive to rate of change of vertical rate, thus providing a signal representative of vertical acceleration of the aircraft. If the output of acceleration generator 11 exceeds certain predetermined positive or negative acceleration limits (in the upward or downward directions respectively) disconnect circuit 13 produces a logic signal which operates a disconnect means for rendering the pitch axis stabilization apparatus ineffective to control the pitch of the aircraft. Generally a servomechanism, not shown, driven by servo output amplifier 15 is used. The logic output is used to mechanically disconnect the servomotor, not shown, of this servomechanism from pitch control surface actuating means. Thus in the unlikely event of a malfunction which produces great vertical acceleration, the pilot does not have to fight the action of the servomotor in flying the aircraft.

Pilot controller 17 provides control of the operation of the entire apparatus. Mode select logic 19, located within controller 17, puts out an appropriate logic signal, depending on the selected mode, to assure that the various analog switches used throughout the apparatus are in the required state (either open or closed). A mode of operation is selected by means of a mode selector switch located on a control panel. When the pilot closes one of these switches, not shown, calling for a particular mode, the corresponding logic line shown as 26 for constant altitude, 27 for constant vertical rate, and 28 for arming the glide slope logic is caused to go to logic high, or +10 volts. Electronic latches, not shown, actuated by pilot operated push button momentary contact switches, are the preferred means of providing these logic signals. These three logic signals must be provided in a mutually exclusive fashion, that is, only one is permitted to go to logic high at any given time with the exception that altitude mode must be engaged, that is, line 26 must be at logic high, if it is desired to cause line 28 to go to logic high and arm the glide slope logic circuit 25 to engage flight along a glide slope. This conforms to one of the several safety criteria which must be met, that of flying the aircraft at constant altitude, before flight along a glide slope is automatically engaged by glide slope logic circuit 25.

Also associated with controller 17 are up switch 21 and down switch 23, used to control the operation of vertical speed, and altitude modifier circuit 29 (hereinafter modifier 29).

It is understood that controller 17 may have its selector switches mounted on a panel which includes controls for performing other aircraft functions such as roll axis control, navigational direction control, or trim control, which do not relate to this invention.

When the pitch axis stabilization system is actuated by the application of power, and any mode other than altitude is selected, as the pilot flies the aircraft to various altitudes the linearized altitude signal from linearizer 7 is used as the input to a storage means, preferably a sample and hold circuit within hold and altitude deviation generator 31 (hereinafter generator 31). This sample and hold which must be capable of long term storage of the amplitude of the altitude signal, is preferably of the digital type. When the pilot wishes to automatically maintain the aircraft at constant altitude he depresses a button on the pilot controller panel which causes logic line 26 to go high. This provides a high logic signal to generator 31, causing the sample and hold to hold the voltage of the altitude signal, making it immediately for use as an altitude reference signal within generator 31.

This stored altitude signal is combined within generator 31 with the linearized altitude signal from linearizer 7, to generate an output which represents the deviation in altitude of the aircraft from the stored altitude. This altitude deviation signal is conducted through altitude deviation signal switch 33 to summing amplifier 35. Switch 33 is closed, in this mode, as a result of altitude logic line 26 being at logic high.

Also closed at this time is vertical speed signal disable switch 37. The opening or closing of this switch is controlled by the logic signal on line 38 which is high, holding switch 37 closed except when the glide slope mode is engaged. When glide slope is engaged logic circuit 25 causes this line to go to logic low, thus opening switch 37 and disconnecting the output of vertical rate generator 9 from summing amplifier 35.

In altitude mode however, the vertical rate signal reaches summing amplifier 35 through switch 37 and is summed with the altitude deviation signal to provide an error signal as an output. This error signal provides a measure of the rate of closure of the aircraft on the stored altitude, helping to achieve smooth changes in aircraft pitch. The error signal is conducted to analog computer 39, which is basically a summing amplifier. Here it is summed with the aircraft's vertical acceleration signal from acceleration generator 11. This combining of the error signal, which is indicative of the rate of closure of the aircraft of the stored altitude, and the acceleration signal, provides basic pitch stability. The acceleration signal opposes sudden changes in aircraft pitch, which produces acceleration caused by changes in the position of the pitch control surfaces. These changes are the result of the output of analog computer 39 producing a control signal which serves as the input to servo output amplifier 15, basically a voltage follower, which in turn produces a signal for driving a servomechanism to control the position of the pitch control surfaces of the aircraft. Thus if the aircraft is caused to deviate from the selected (stored) altitude by turbulence or by a shift in weight within the aircraft, a control signal to the servomechanism causes the pitch control surfaces to change position in the proper direction to begin bringing the aircraft back to the selected altitude. This causes the aircraft to accelerate, resulting in an acceleration voltage acting to limit the rate of rotation of the aircraft to produce smooth transitions in pitch and therefore altitude deviation signal by effectively limiting the control signal, in this case potentially in a manner dependent on rate of closure of the aircraft on the desired altitude.

Thus summing amplifier 35 and analog computer 39 when used to fly the aircraft at constant altitude constitute a means shown enclosed by dotted line 42 of combining or mixing the aircraft's linearized altitude signal, the stored altitude signal, the aircraft's vertical rate signal and the aircraft's vertical acceleration signal to provide a control signal for directing a means for positioning the pitch control surfaces of the aircraft, usually the elevators. The reference signal is used, where appropriate, to properly bias the necessary circuitry, as shown in the figures below. While the above description constitutes a particular way of performing this function, many other ways will occur to one skilled in the art after reading the description.

As the pilot flies the aircraft at a particular altitude, which is really a pressure altitude, he may find that the pressure which produced the altitude signal voltage amplitude which he stored when activating the altitude hold mode, is no longer representative of exactly the original altitude. He may typically find this is so when correcting his altimeter for changes in barometric pressure. If this change were large, it would be necessary to disengage the altitude hold mode and fly the aircraft to a new altitude, in this case the actual altitude previously selected. This however is generally not the case, and usually a minor correction is sufficient.

To make such a minor correction it is necessary to supply an additional voltage to the means, within generator 31, which combines the stored altitude signal with the linearized altitude signal from linearizer 7. This voltage when combined with the other two signal voltages produces a change in the altitude deviation signal, causing the aircraft to fly to a new altitude and then hold that altitude.

Modifier 29, in the altitude mode, provides such a voltage, which changes amplitude in an upward direction in response and preferably proportionately to the length of time that up switch 21 is held closed, and changes amplitude in a downward direction in response to and preferably proportionately to the length of time that down switch 23 is held closed by the pilot.

Generally, when the aircraft takes off after some initial maneuvering, the pilot will manually establish a comfortable rate of climb. At some point he may wish to use the apparatus of this invention to keep the aircraft climbing at this rate.

To have the aircraft fly at a constant vertical rate, either for ascent or descent, the pilot will press the button on the panel of pilot controller 17 which operates a logic latch causing line 27 to go to logic high. At this time mode select logic 19 forces line 28 and line 26 to be low. Altitude deviation switch 33 thus is opened, disconnecting generator 31 from summing amplifier 35. As a result of logic line 27 going high, modifier 29, after a time interval of approximately 200 milliseconds, stores in a circuit, within modifier 29, which is used as a sample and hold in the vertical rate mode, the amplitude of the vertical rate signal produced by vertical rate generator 9 at the instant of time the vertical rate mode is engaged. This signal is supplied to modifier 29 along line 40.

This stored vertical rate signal is supplied through switch 41, closed only in the vertical rate mode in response to logic line 27 being high, as an input to summing amplifier 35. As a result of switch 37 also being closed, as described above, the subsequent varying actual aircraft vertical rate signal is also supplied to summing amplifier 35. This signal voltage and the stored vertical rate voltage are combined to produce an error signal output of summing amplifier 35 which is representative of the deviation of the aircraft's vertical rate (vertical speed) from the stored value. This error signal is supplied as an input to analog computer 39 which sums the error voltage with the aircraft's acceleration voltage from acceleration generator 11, producing a control signal. The control signal then is buffered by servo output amplifier 15 which provides at its output a signal to the servomechanism controlling the pitch control surfaces of the aircraft, i.e. the elevators.

Thus the summing amplifier 35 and analog computer 39 when used to fly the aircraft at constant vertical rate constitute a means, shown enclosed by dotted line 42, for combining the aircraft's actual vertical rate signal with a stored vertical rate signal and the aircraft's acceleration signal to provide a control signal for directing a means for positioning the pitch control surfaces of the aircraft, usually the elevators. The reference signal is used, where appropriate, to properly bias the necessary circuitry, as shown in the figures below. While the above description constitutes a particular way of performing this function, many other ways will occur to one skilled in the art after reading the description.

A change in the aircraft's vertical speed can be produced by changing the voltage stored in modifier 29. When used in the vertical speed mode the stored vertical rate signal voltage is changed positively in response to, and preferably proportionately to the length of time that up switch 21 is held closed and negatively in response to and preferably proportionately to the length of time that down switch 23 is held closed by the pilot. Thus it is possible within certain limits by depressing the up switch to increase rate of climb, or change a descent to an ascent. Depressing the down switch will change an ascent to a descent, or increase the rate of descent.

The limits of rate of climb or descent are generally $+1500$ feet/minute. It is not possible, however, to fly the aircraft for an unlimited time at a rate of climb outside the design performance envelope of the airframe/engine combination. For example, if a particular rate of climb is selected, as the aircraft gains altitude, its pitch angle with respect to the horizontal will continue to increase at a given engine power setting, trading altitude gain for loss in forward speed. At some point the aircraft will no longer climb at the rate commanded by the stored vertical speed signal. The error signal output of summing amplifier 35, which is zero if actual vertical speed is equal to stored vertical speed, will begin to increase in amplitude. Stall warning system 43, which is active only in the vertical rate mode when logic line 27 is high, monitors this increase in error signal from summing amplifier 35, and provides an output which actuates a pilot warning means, such as a flashing light, when the error signal exceeds a predetermined amplitude, preferably the equivalent of a negative vertical rate deviation of about 200 feet per minute, for longer than a predetermined time, preferably about 15 seconds. This warns the pilot to check his instruments to determine whether he is attempting to have the apparatus of the invention fly the aircraft in a manner inconsistent with the aircraft's design or power level, and if so, take corrective action. If the pilot was not so warned, and was not cognizant of other warnings indicative of a stall, then inaction could result in the forward speed of the aircraft eventually falling to the point where a stall occurs. The pilot may alleviate difficulty by increasing engine power, eliminating the command to climb, switching to altitude mode to hold the altitude of the aircraft, disengaging the autopilot and flying the plane manually, or by decreasing the commanded rate of climb by depressing the down switch 23.

When up switch 21 is used to increase the commanded rate of climb, there is some delay involved in the rotation of the aircraft to a pitch angle appropriate for that rate of climb. While some provisions have been made in the circuitry as described below to reduce this time, generally it is undesirable for the stall warning indicator to flash when the up switch is depressed. Line 44, which goes to logic high when the up switch is depressed thus provides a signal which inhibits the stall warning system from indicating an impending stall. Of course it might still be possible to stall the aircraft by commanding an excessive climb rate, but at this time the pilot's attention is almost invariably already on the flight instruments and a warning would be superfluous.

The apparatus of this invention, when used with an appropriate navigational receiver, can fly the aircraft in its descent along a glide path. Glide slope logic 25 can be used, after being armed by logic line 28 going high, to engage glide slope flight. Safety considerations require, however, before the glide slope mode may be engaged, that certain conditions be met. Thus it is necessary that the proper Instrument Landing System (ILS) frequency be selected on the navigational receiver in order to receive the localizer signal before the glide slope path is reached. A valid glide slope flag must be present, and there must be a glide slope needle position signal representative of between fifty percent and one hundred percent upward deflection of the glide slope position needle with respect to its center position. These and possibly other required logic or signal inputs to the glide slope logic which serve the purpose of assuring that such safety conditions are met before the glide slope is engaged are not shown. The glide slope logic used is conventional, and well known in the art.

As indicated above, another safety requirement is that the aircraft be flying at constant altitude before automatic engagement of the glide slope mode. Thus before glide slope arm logic line 28 can be made to go high, altitude logic line 26 must be high. When the pilot pushes the button actuating the latch circuit which causes glide slope arm logic line 28 to also go high (a condition permitted by mode select logic 19, as described above) glide slope logic circuit 25 is prepared for arming. As the approach is made (assuming all other conditions indicated above are fulfilled) and the aircraft is flying in below the glide path, the glide slope needle deflection is more than fifty percent upward. At this point a delay time of about ten seconds is initiated. If all conditions are still met at the end of this delay, the glide slope is armed. As the aircraft continues to fly toward the center of the glide slope, needle deflection drops to about five percent. At this level of the needle position signal, the glide slope logic puts out a logic high on line 46, engaging the glide slope mode by providing a logic high to switches in and associated with glide slope computer 47, such as glide slope switch 49 and glide slope rate switch 51. Glide slope is engaged at five percent needle deflection rather than zero to allow time for the aircraft to rotate in pitch to the proper attitude for following the glide slope as it flies into its center. This provides an extremely smooth transition to glide slope flight by preventing overshooting which might require a large pitch angle to allow the aircraft to fly down to the center of the glide path. Line 52 provides a logic signal to the mode select logic, releasing the latch holding altitude line 26 (from mode selector logic 19) at logic high. The method of operation of the glide slope logic, the mode select logic, and the interaction between them are well known in the art.

The cancellation of altitude hold causes logic line 26 to go low. This results in the opening of switch 33, thus disconnecting the altitude deviation signal from summing amplifier 35. Also disconnected from amplifier 35 is the vertical rate signal by virtue of the fact that glide slope engage line 38, the logical opposite of glide slope engage line 46, is low, resulting in the opening of switch 37. Glide slope mode is the only mode of operation in which switch 37 is open.

The vertical rate signal from generator 9 is applied to an input of glide slope computer 47 as is an isolated glide slope needle position signal. A navigational receiver, not shown, tuned to the proper ILS frequency provides a glide slope needle position signal. Isolator 53, required by safety regulations, serves to allow the glide slope needle signal to be referenced to a different voltage than the reference voltage of the apparatus of the invention. It also is designed to prevent a failure on its output side from loading down the glide slope signal, resulting in possible pilot deception due to a smaller needle deflection than warranted by the aircraft's position being displayed. Isolator 53 may be of several possible well known types. Its operation may be based on techniques used in high gain operational amplifiers such as chopping the input signal, capacitively coupling the resulting a.c. signal, buffering it by means of a voltage follower, detecting the output by means of a detector synchronized to the chopping to recover the input signal, and filtering the resulting output.

Glide slope computer 47 processes and combines the vertical speed signal and the isolated glide slope needle position signal to provide an output representative of the aircraft's deviation from and rate of closure on the glide path. The means for performing this function is more fully described below with reference to FIG. 11.

With the exception of reference, which is always present, the glide slope signal output of computer 47, connected to summing amplifier 35, is thus the only input applied to summing amplifier 35. Amplifier 35 functions basically as a buffer, with less than unity gain during glide slope operation.

A second output of computer 47 is a glide slope rate signal. This signal is responsive to rate of change of the sum signal of a filtered vertical speed signal produced within computer 47 and the isolated glide slope needle position signal. The glide slope rate signal, the output of acceleration signal generator 11 and the output of summing amplifier 35 are combined by analog computer 42 to produce the control signal, which then controls a means for positioning the elevators of the aircraft.

Thus amplifier 35, computer 47 and computer 42 constitute a means for combining the vertical rate signal, the isolated needle position signal and the acceleration signal to produce a control signal. The reference signal is used, where appropriate, to properly bias the necessary circuitry, as shown in the figures below, and appropriate intermediate signals are derived as described generally above, and more specifically below.

Having thus fully described in FIG. 1 the interactions between the various circuit blocks, and generally the operation of the circuits, it will be useful, for a complete understanding of the operation of the apparatus to describe in more detail the operation of the circuits illustrated in FIG. 2 through FIG. 11.

Figure 2:
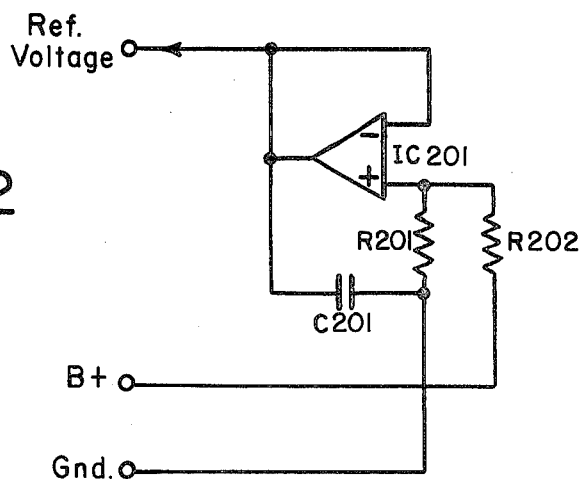
FIG. 2 is a schematic diagram of the reference generator of FIG. 1.

Referring to FIG. 2 there is illustrated the reference generator 1 of FIG. 1 in which, a reference voltage is generated by means of a voltage divider comprised of resistors R201 and R202, which is buffered by operational amplifier IC201, configured as a voltage follower. Capacitor C201 provides a bypass to ground for transients that might appear, from several possible sources. The values of R201 and R202 are equal, thus generating a reference voltage (hereinafter reference or ref.), equal to one half the supply (B+) voltage. Any other type of stable reference source could be used.

Figure 3:
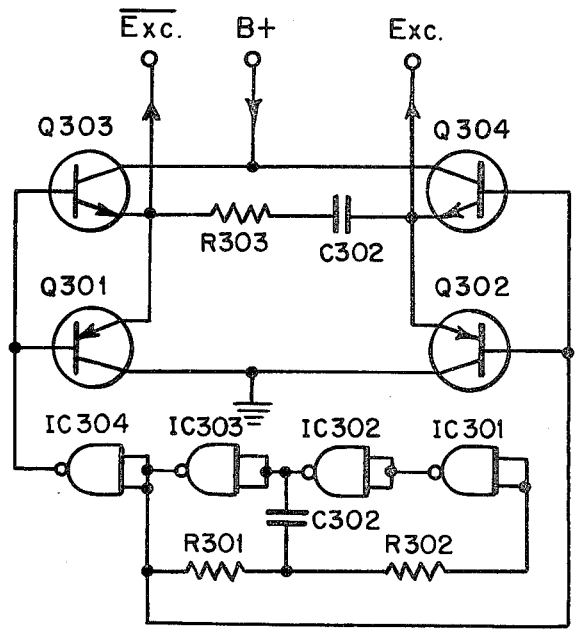
FIG. 3 is a schematic diagram of the excitation oscillator of FIG. 1.

Referring to FIG. 3, there is illustrated the excitation oscillator 3 of FIG. 1 which comprises NAND gates IC301, IC302 and IC303 wired as inverters is shown. Capacitor C301 is alternately charged and discharged through resistor R301 with resistor R302 providing feedback to IC301. Such circuits are well known in the art. Capacitor C301 and resistor R301 are chosen so that the frequency of the oscillator is approximately 5 KHz and the output approximates a square wave. In practice any frequency between 400 Hz and 10 KHz would be adequate as a clock for the digital circuitry described below. Any other square wave oscillator, such as an appropriately configured astable multivibrator could also be used. Transistors Q301, Q302, Q303 and Q304 are configured as a complementary symmetry amplifier, also well known in the art. The input and output of IC304, wired as an inverter is supplied to this amplifier. Resistor R303 and capacitor C302 provide filtering of any transients which may result, especially if the output of the amplifier is used to drive an inductance, as may be the case if an auxiliary mechanical accelerometer as described below is used for operation of only the disconnect circuit. If this is not the case, then the amplifier still provides a buffered output with great fan-out capability. As will be shown below, the outputs of the excitation oscillator of FIG. 3 are used to drive the counters of the digital sample and holds of FIG. 5 and FIG. 8.

Figure 4:
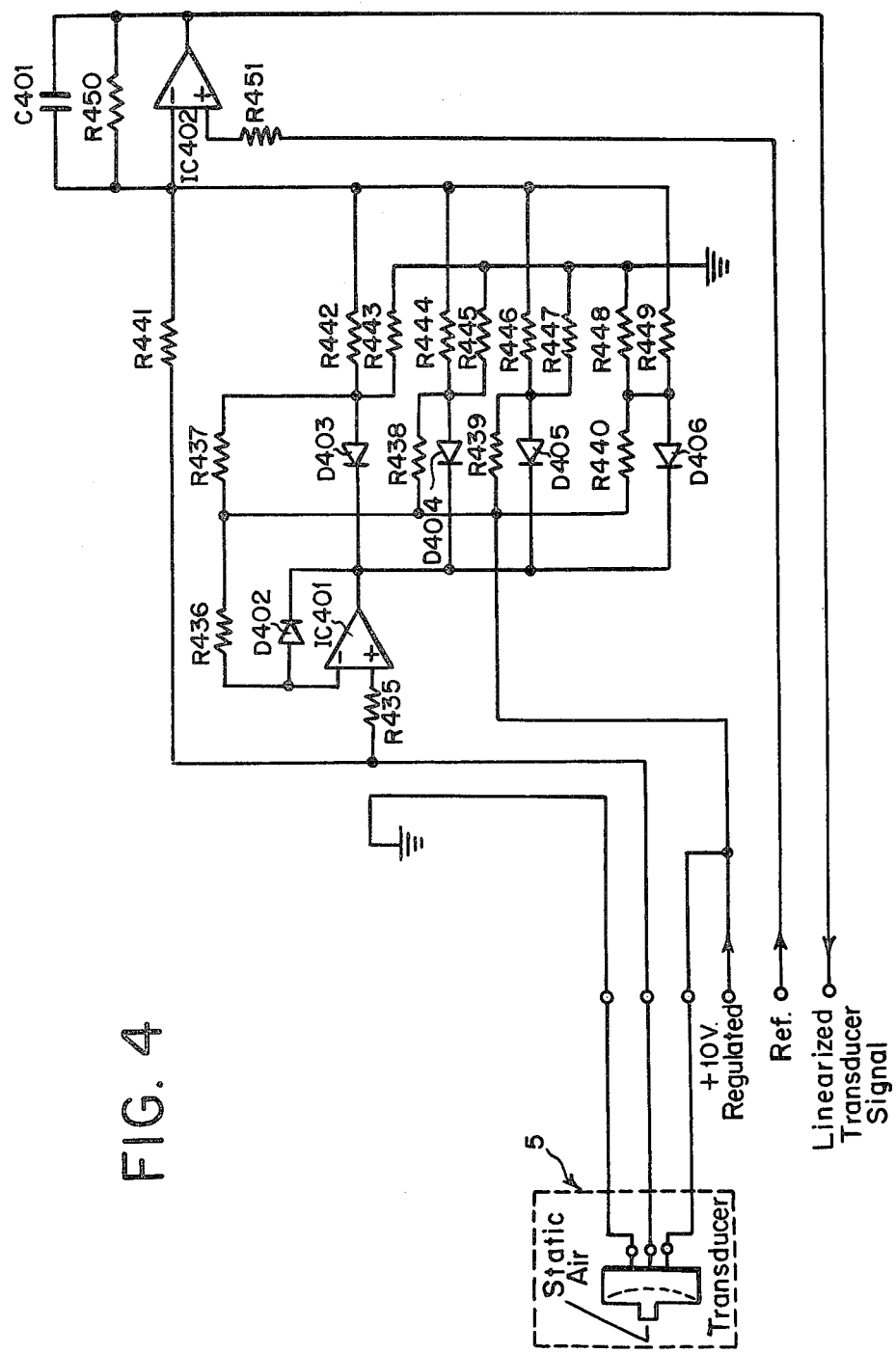
FIG. 4 is a schematic diagram of the linearizer shown connected to the pressure transducer, both of FIG. 1.

Referring to FIG. 4, there is illustrated the linearizer 7 of FIG. 1 where the transducer 5 is used to generate a voltage proportional to the absolute pressure of the aircraft's static air source. Transducer 5 is an alumina variable capacitance sensor comprised of a thick circular alumina substrate separated from a thin alumina diaphragm by a glass band approximately 0.002 inch thick that circumvents the diaphragm and the substrate, forming a pressure seal between them. Two conductive electrodes are screened on the inner surfaces of the substrate and the diaphragm forming the capacitive plates. As pressure is applied to the diaphragm, it deflects toward the substrate and increases the capacitance. Suitable circuitry, of a hybrid nature, is used to convert this capacitance to a voltage proportional to pressure. Such transducers are well known, being sold as the Series P609 by Kavlico Corp. of Chatsworth, California for use in the regulation of the air/fuel mixture in automobiles sold in California by a major automobile manufacturer. The characteristic of this type of transducer, which permits it to be used in the invention, is its low hysteresis and excellent repeatability which are typically, when combined, below 0.006 percent full scale.

The output signal from the transducer, when excited from the regulated 10 volts, is a DC voltage which, at sea level with an atmospheric pressure of 29.92 inches of mercury is approximately 8½ volts. As altitude increases, the absolute pressure decreases, and the voltage decreases proportionately. At sea level the scale factor is approximately 300 millivolts for a change of 1000 feet. At 18,000 feet it is only 150 millivolts for the same change. The transducer signal is linearized with respect to altitude by the stepped linearizer of FIG. 4.

This signal is connected to R435, and is coupled through R441 to the input of IC402 which is configured to have a gain factor of 0.82 by selection of the values of R441 and R450. IC401 is a unity gain buffer which has diode D402 in the inverting feedback path. A positive bias current at the anode of D402 is supplied by R436 connected to the regulated B+. This causes the output of IC401 to be approximately one half volt lower than the signal voltage from the tranducer. The purpose of this is to produce an, equal voltage drop to linearizer level detector diodes D403, D404, D405 and D406. D402 also compensates for changes in the voltage drop across level detector diode D403, D404, D405 and D406, due to temperature. As altitude increases, transducer voltage decreases. Eventually, it decreases to the point where the cathode of D403 is approximately one half volt negative with respect to the anode. At that point D403, with a voltage divider comprised of R437 and R443 biasing its anode, starts to conduct and provides at its anode a DC voltage which is directly proportional to the signal from the transducer. This voltage is coupled through R442 which effectively parallels R441, increasing the gain of IC402 to correct for the reduced air pressure as the altitude is increased. D404, D405, and D406 and their associated voltage divider resistors R438 and R445, R439 and R449, and R440 and R448 perform the same function except that the voltage divider resistors associated with the anodes of these diodes provide a different level at which the diodes start to conduct, therefore providing a stepped gain increase at greater altitudes to compensate for the decrease in atmospheric pressure differential per given increment of altitude.

Signals conducted at various altitudes through R441, R442, R444, R446 and R449 mix at the inverting input of IC402 and are amplified to provide at the output IC402, a voltage which is directly proportional to altitude. C401 provides a small degree of filtering of static system noise. R451 connects the noninverting input of IC402 to the reference generator, causing IC402 to provide an output of zero volts when the signal at its inverting input is equal to the reference voltage, or 5 volts.

Figure 5:
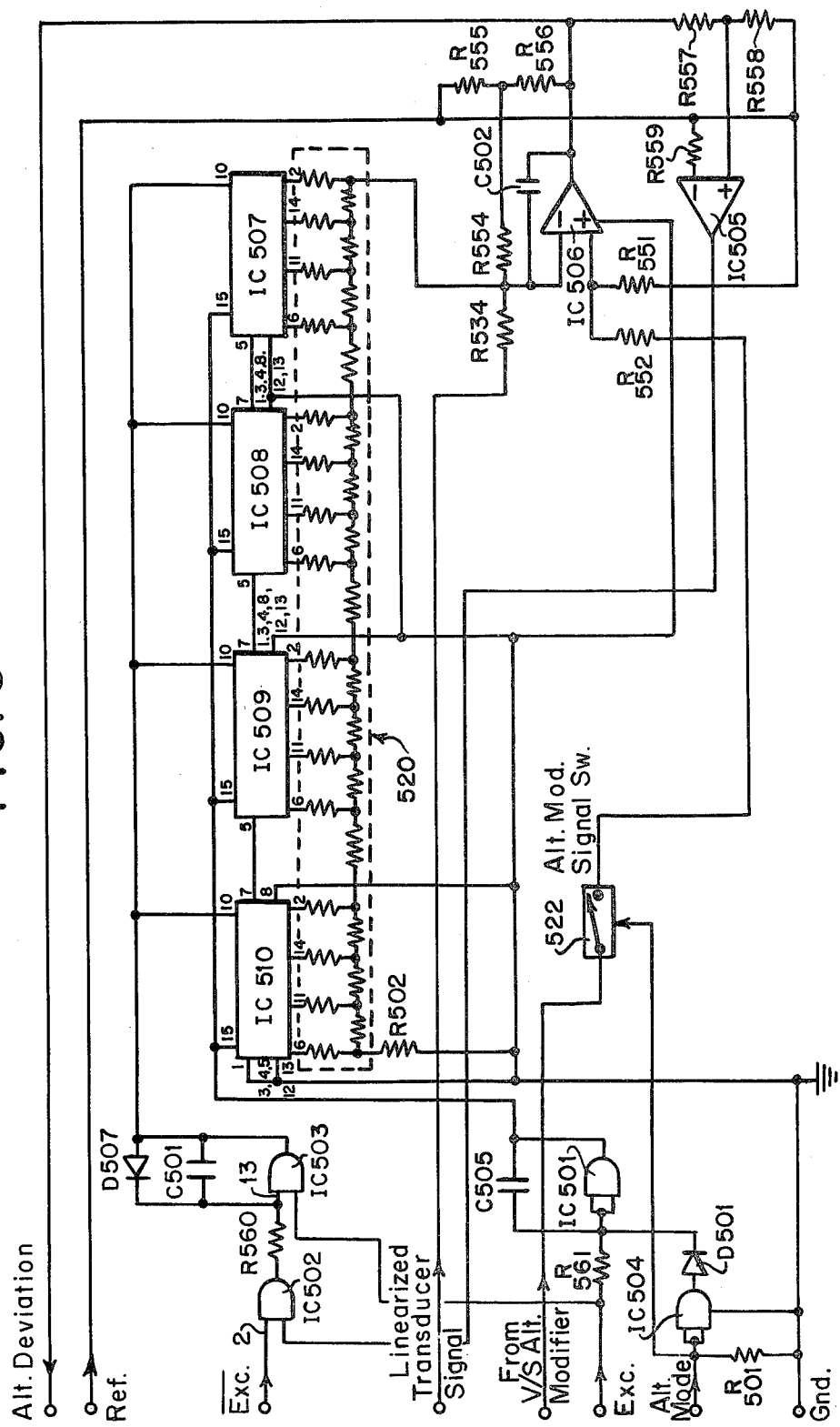
FIG. 5 is a schematic diagram of the hold and altitude deviation generator of FIG. 1.

Referring to FIG. 5 in which the hold and altitude generator 31 of FIG. 1 is shown, the linearized signal from the linearizer of FIG. 4 is used as a signal to which the altitude hold portion of the altitude hold and deviation generator of FIG. 5 is continuously synchronized in any mode other than altitude hold. A sixteen bit digital up/down counter comprised of IC507, IC508, IC509 and IC510, and a resistor-ladder type digital to analog converter 520, enclosed by dotted line, form a digital sample and hold circuit which, when it is desired to hold the aircraft at an altitude to which it has been flown, stores the amplitude, or voltage of the linearized altitude signal, at that particular altitude. The use of a sixteen bit counter means that each count represents approximately one half foot of altitude.

Generally, the counter, comprised of IC507 through IC510, counts in response to the excitation oscillator signal, delayed and buffered by IC501 and applied to pin 15 of the integrated circuits IC507 through IC510. The digital output of IC507 through IC510 is converted by the digital to analog converter 520, to an analog voltage, which is summed with the linearized transducer signal at the inverting input of IC506. The opposite end of the resistor ladder network is connect to ground through resistor R502.

The output of IC506, which is referenced to +5 volts by virtue of R551 being connected to the reference voltage, is thus either greater or smaller than +5 volts depending on the relative values of the voltage output of the digital to analog converter 520, and the linearized transducer signal.

Comparator IC505 has its reference input connected to the +5 volt reference supply by virtue of resistor R559. Resistor R558, also connected to reference, provides a reference for the signal input of IC505. The output of IC506, an inverting amplifier, is connected through resistor R557 to the signal input of IC505. The output of comparator IC505, provided to AND gate IC502, (which then provides at the appropriate phase of the $\overline{EXC}$ signal, an output to AND gate IC503), determine the direction of count of the counter comprised of IC507 through IC510, by determining whether the output of IC503 is low or high, thus holding pins 10 of IC507 through IC510 high for up counting and low for down counting. The up/down counter is thus caused to count in that direction which causes the analog output of digital to analog converter 520 to be substantially equal to the linearized altitude signal.

There is a problem, however, associated with the use of up/down counters in a closed loop sample and hold system in that if the up/down select line happens to be transitioning through the logic threshold at the time a clock pulse is applied, the counters may clock erroneously due to the fact that different integrated circuits will change count direction at slightly different voltages on the up/down control line (Pin 10). Therefore it is necessary to provide an up/down select logic function which does not occur at the same time as the clock pulse to the counter. Assuming that the digital sample and hold has clocked up to the point where it provides an input current to the inverting input of IC506 substantially equal and opposite to the transducer signal current which is provided through R534, the output of IC506 will be zero relative to signal reference. Comparator IC505 compares the output of IC506 to signal reference, to determine the direction of the error of the sample and hold with respect to the linearized altitude signal. When the output of IC505 is positive (high) the counters must clock up or increase the digital count. Therefore, when the excitation generator output labeled $\overline{EXC}$ (at Pin 502 of IC2) is positive and the output of IC505 is positive, the output of AND gate IC502 will also be high and cause C501 to charge through R560. Pin 13 of IC503 is held positive for a short time by the charge on C501 at the time the clock generator transitions, that is EXC goes low and $\overline{EXC}$ goes high. Therefore, both inputs to AND gate IC503 will be high and the output will go high. Pin 13 will continue to be held high during this condition by virtue of D507 connected from the output to Pin 13. The output of IC503 is also connected to Pin 10 of all of the integrated circuits which comprise the counter of the digital sample and hold and this causes the counter to count up.

At the time the excitation line transitions from negative to positive a current is supplied through R561 to the inputs of IC501. C505 starts to charge. It takes approximately 16 microseconds for C505 to charge to the threshold level of IC501, therefore providing a delay in the clock pulse to the counter of approximately 16 microseconds after the output of IC503 has gone high. Assuming that the output pin of comparator IC505 were transitioning from negative to positive at the instant the clock generator transitioned, there would not have been sufficient time for C501 to charge through R560 and therefore the output of IC503 would have remained low at the time of the transition. After the $\overline{EXC}$ goes to zero there is no way of causing C501 to charge again until the cycle of the excitation voltage is repeated. Therefore, IC502, IC503 and IC501 are timing circuits which assure that the up/down select line which is Pin 10 of the counter circuits which comprise the up/down counters, can never transition at the same instant the clock pulse on Pin 15 of the counter circuits is transitioning. Thus, there are time delays associated with IC503 and IC502 of approximately 7 microseconds and 16 microseconds respectively, separating the transitions of their outputs by approximately 9 microseconds.

After the counter in the digital sample and hold has clocked to provide an equal and opposing current to the linearized transducer signal, the output of IC506 will be very close to zero volts. The counter will clock back and forth three or four counts but the output of IC506 will remain very close to zero volts relative to reference. At the instant altitude mode is selected, the input goes high. This logic high is buffered by IC504, its output going high. The inputs of IC504 are held low by resistor R1 until altitude mode is selected. This logic high is coupled through D501 holding the inputs of IC501 high, and therefore inhibiting clock pulses from the counters. The count in the sample and hold counter simply stops changing, thus providing a stored altitude reference. As the altitude changes the linearized transducer signal will vary up or down (go high or low) relative to the stored reference in the sample and hold. This variation coupled through R534 at the input of IC506 will be amplified in IC506 with a gain factor of 200 determined by the values of R554, R556 (relative to R534), which provide feedback to the inverting input of IC506 through R554. The altitude error voltage will be 5 volts for 100 feet. This is used in the analog computations as described below to aid in providing a control signal to the control surface of the aircraft to maintain a level altitude.

When altitude mode is selected, altitude modifier signal switch 522 is closed, allowing an altitude modifier signal, as described above, from modifier 29 to be conducted through resistor R552 to IC506. Capacitor C502 provides moderate filtering of the output of IC506.

Figure 6:
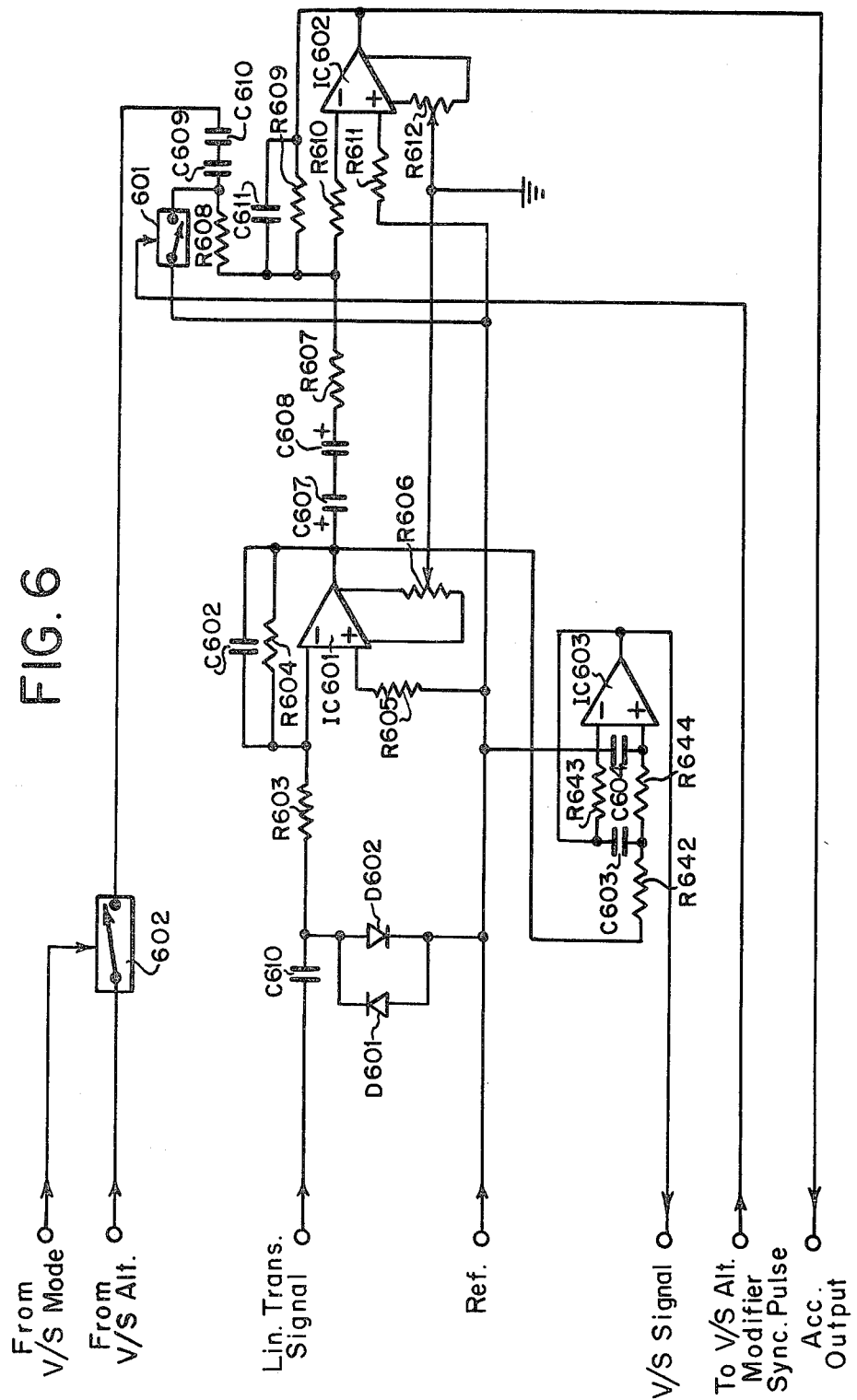
FIG. 6 is a schematic diagram of the vertical rate generator and vertical acceleration generator of FIG. 1.

Referring to FIG. 6, the derivation circuits of the vertical rate generator 9 and vertical acceleration generator 11 are illustrated. The linearized transducer signal output is scaled so that 250 millivolts represents 1000 feet of altitude. The vertical speed signal is derived from the altitude signal by the differentiator circuit made up of C610, R604, IC601 and associated circuitry. The values of C610 and R604 are chosen, as is well known in the art, to provide that when the altitude changes and the input voltage of the linearized transducer signal varies at 250 millivolts per 1000 feet, the differentiated signal at the output of IC601 is advantageously scaled to represent the rate of change of altitude. The output will be a steady state voltage when there is a perfectly constant rate of climb or rate of descent. The output of IC601 will under these circumstances be a DC voltage with a polarity relative to signal reference determined by whether the aircraft is climbing or descending. If the vertical speed varies (if there is a change in vertical rate) then there is also an acceleration associated with that change in speed. IC602 and its associated circuitry primarily C607, C608 and R609, also comprising a differentiator, detect the rate of change in vertical speed. The output of IC602 therefore is a derived vertical acceleration signal derived from the rate of change of the rate of change of altitude as represented by air pressure. The acceleration signal out of IC602 is then used as the basic stability ingredient in the invention. With no signals present other than the derived acceleration signal, this signal serves to prevent the aircraft from changing anything in the pitch axis, thus preventing the aircraft from changing vertical speed. Therefore level flight can be maintained, or if the aircraft is caused to climb or descend at a constant rate with no other signals present by manually placing the aircraft in an attitude which results in some vertical speed, the output of IC602 will serve to cause the aircraft to maintain that vertical speed. In other words, it opposes changes in vertical speed from an established vertical speed, resulting in basic pitch stability without the use of a vertical or rate gyro.

The output of IC602, as described below, is used by the computer section of FIG. 11.

The output of IC601 is connected to an active filter comprised of IC603 and associated components R642, R643, R644, C603 and C604. It is a non-inverting unity gain active filter that simply filters some of the noise from the vertical speed signal which results from rapid variations in the altitude pressure signal due to turbulence or minor perturbations in the static air pressure. These variations are more advantageously filtered at this point, rather than at the altitude signal output if faithful vertical rate and vertical acceleration signals are to be produced. R642 and C603 provide a time constant of approximately 0.1 second, while R644 and C604 provide a time constant of approximately 0.02 second. Also providing filtering of this sort are low pass filters with cut off frequencies of between two and one half and three hertz comprised of R603 and C602 associated with IC601, and R607, R610 and C611 associated with IC602. Also associated with these amplifiers are R605 and R611 which are used to reference the noninventing inputs to the +5 volt supply. Potentiometers R606 and R612 are used to trim the outputs of IC602 and IC603 to reference when no signals are present.

Diodes D601 and D602 permit rapid charging of capacitor C610 after power is applied resulting in rapid settling of the input voltage of IC601. In the altitude mode, vertical rate, being rate of change of altitude, is required to provide a measure of rate of closure on the altitude if there has been a disturbance and the aircraft has been driven off the correct altitude, or the altitude mode has just been engaged and the aircraft must rotate to get to the correct altitude, previously selected. In this case the aircraft climbs through the selected altitude while it is rotating and then descends back to that altitude. Thus the vertical rate signal provides a measure of the rate of closure on the altitude and increases stability.

When engaging the vertical rate mode, as described generally above and in more detail below, modifier 29, unlike the altitude sample and hold, must count to, or synchronize, during a short period of, for example, 200 milliseconds, to the aircraft's vertical speed. It is undesirable for any spurious motion of the aircraft to generate an acceleration signal during this period, or of more importance for the aircraft to attempt to follow the rapidly changing modifier signal during the sync pulse. The sync pulse therefore is supplied to close switch 601, connecting through R608, the inverting input of IC602 to the reference supply. This prevents IC602 from generating transient outputs which would destroy stability during synchronization.

When the voltage stored in the modifier is changed, however, by the use of the up or down switches, it is generally desirable for the aircraft to follow the command rapidly. Switch 602, also closed in the vertical rate mode, provides a means of connecting the output of modifier 29, when it is varying, to the input of IC602 by means of coupling capacitors C609 and C610, and resistor R608. While the operation of the apparatus would be quite satisfactory without providing this signal from modifier 29, it is preferable to include it. Switch 601 is of course open when the stored vertical rate is thus modified.

Coupling capacitors C609 and C610 are of the polarized type, put back to back, to substitute for a single nonpolarized capacitor, which would be much more expensive. This is also the case for capacitors C607 and C608.

The vertical rate signal output of IC603 is also used by the glide slope computer, as described below with reference to FIG. 9.

The transducer, linearizer, and vertical rate generator thus constitute a means, responsive to rate of change of altitude, for generating a vertical rate signal.

Figure 7:
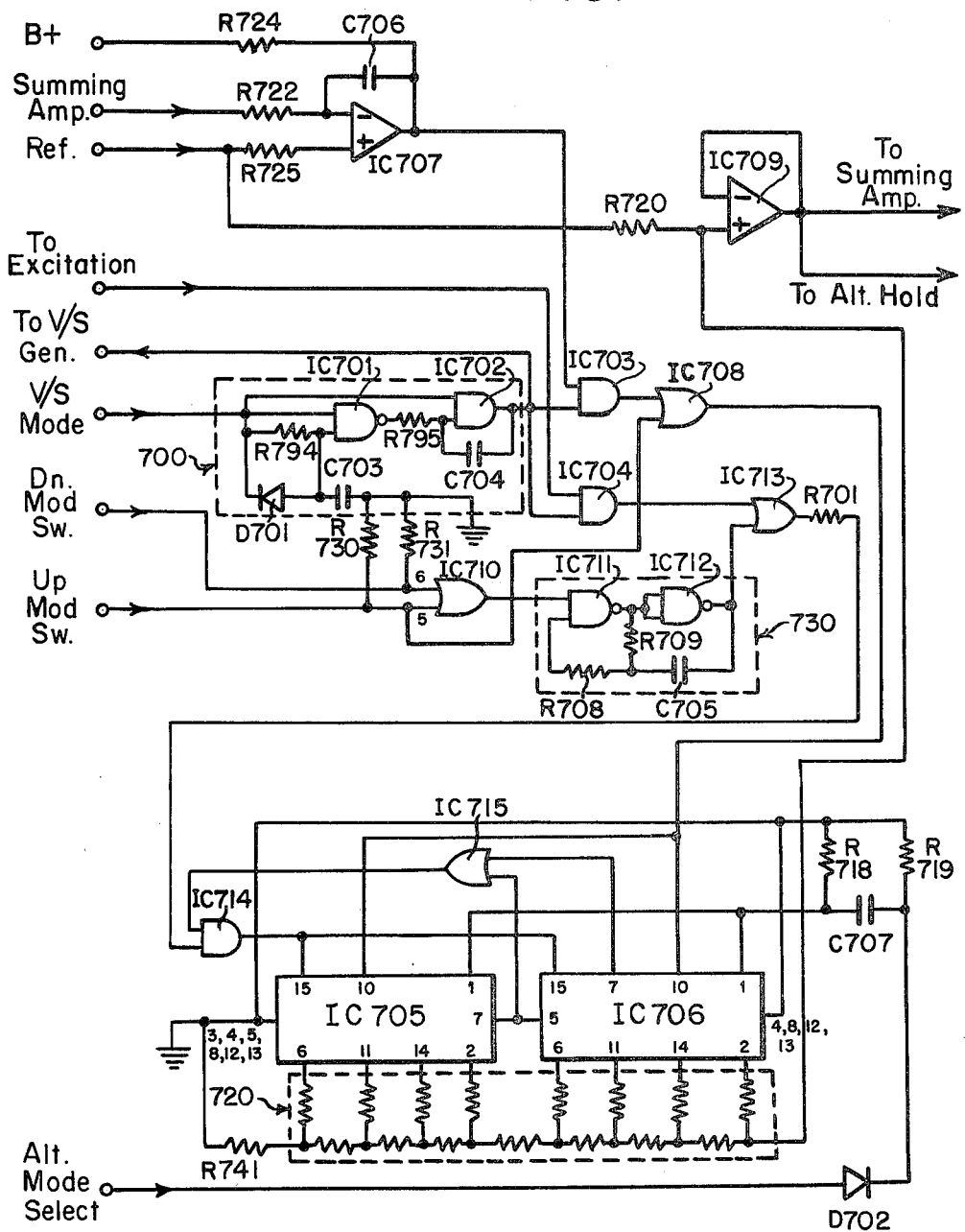
FIG. 7 is a schematic diagram of the vertical speed and altitude modifier of FIG. 1.

FIG. 7, shows a schematic of the vertical speed and altitude modifier 29, including the digital sample and hold, as well as associated control logic. When vertical speed mode is selected, the upper input pins of NAND gate IC701, and AND gate IC702 are forced to go high. Prior to selecting the vertical speed mode, that line is low and capacitor C703 on the lower input of IC701 is discharged. When vertical speed mode is selected, capacitor C703 holds the lower input pin of IC701 low, and its output goes high. As the vertical speed mode input caused the upper input pin of IC702 to go high, and the lower input pin of IC702 is held high by the output of IC701 conducted through R795, the output of IC702 will be high. C703 will start charging immediately upon the selection of the vertical speed mode and it will take approximately 200 milliseconds for C703 to charge through R794 up to the logic threshold of IC701. When the threshold is exceeded, both inputs of IC701 will be at logic high causing its output to go to zero, thus pulling the lower input of IC702 to zero and terminating the pulse in approximately 200 milliseconds. The time is controlled by the values of R794 and C703. Thus the components enclosed by dotted line 710 form an inexpensive pulse generator. A monostable multivibrator could also be used. This positive pulse of a 200 millisecond duration is coupled to the control line of switch 601 of FIG. 6, as described above. It is also coupled to IC703 and IC704 enabling these logic gates so that they can control the up/down select line of the counters of the digital sample and hold made up of counter circuits IC705 and IC706 and the associated resistor ladder which constitutes a digital to analog converter, enclosed by dashed line 720.

The reference input of comparator IC707 is connected through resistor R722 to the output of summing amplifier 35 of FIG. 1. When the aircraft is flown manually, as is the case before vertical speed mode is selected, the output of the summing amplifier will be of a polarity with respect to reference, related to whether the aircraft is climbing or descending. That polarity is detected by voltage comparator IC707 which has its signal input connected to reference through resistor R725. The output of IC707, a comparator of the open collector type, aided by pull up resistor R724 to B+ will swing from B+ to zero volts supplying an output which determines the direction in which the vertical speed synchronizer must clock in order to establish an equal and opposing current to the actual vertical speed input from the summing amplifier, in order to store a command voltage for maintaining the vertical speed that existed at the time the vertical speed mode was selected.

The output of IC707 is connected to an input of IC703. Assuming that the output of comparator IC707 is positive at the instant vertical speed mode is selected then for 200 milliseconds both inputs of IC703 are high. This provides a positive output of IC703 which is coupled through the OR gate IC708. The output of IC708 will thus provide a positive gate for as long as the output of comparator IC707 stays positive and the 200 millisecond pulse has not terminated, causing the counter in the sychronizer to count in the up direction, as a result of Pin 10 of IC705 and IC706 being held high. The output of resistor ladder 720 is connected to the input of IC709 which is a non-inverting buffer connected to reference through resistor R720. The other end of resistor ladder 720 is connected to ground through resistor R741. IC709 simply buffers the output of this high impedance resistor ladder providing a low impedance voltage which is proportional to the digital count in the counters.

The output of IC709 is then coupled, as described below in FIG. 11, in the vertical speed mode, to the input of summming amplifier 35 of FIG. 1. The up/down control of the counter causes the counter to count to a level which provides an equal and opposing current to the vertical rate output of vertical rate generator filter IC603 of FIG. 6 at the input of summing amplifier 35. This produces a zero error signal between the actual vertical rate voltage and the vertical rate voltage derived from the count stored in IC705 and IC706. In other words, IC705 and IC706 are synchronized to the vertical speed existing at the time the vertical speed mode was selected, and as this must occur in a time shorter than 200 milliseconds when a 5 KHz clock, or excitation source is used, comparator IC707 will cause the counter to hunt up and down for two or three counts with respect to the proper value, until the 200 millisecond synchronization pulse has terminated. Capacitor C706 serves to prevent short transient signals from appearing at the output of IC707.

If it is desired to change the vertical speed which has been stored in the modifier the up or down modifier switches of the pilot controller may be used. These switches are connected to input pins 5 and 6, respectively, of IC710. Resistors R730 and R731 hold inputs 5 and 6 of IC710 low when the modifier switches are not activated. As indicated above, to increase rate of climb or change a descent to an ascent, the up modifier switch is used. It provides a high logic level to Pin 5 of IC710 and to the bottom input of IC708. When this input of IC708 goes high, its output which is connected to the up/down selector pins on the counter will go high. A high on Pin 10 of the counter circuits will cause the counter to count up. When the output of IC710 goes high it causes the upper input of IC711 to go high, enabling a relaxation oscillator enclosed by dotted line 730 comprised of IC711, IC712 and associated components R708, R709 and C705. Oscillator 730 has a clock rate of approximately 13 hertz. Pulses from the output of IC712 are connected to the lower input of OR gate IC713. The output of IC713, responsive to the input, then couples these pulses to the lower input of IC714, an AND gate, through R701. The output of IC714 will clock at this 13 hertz rate, causing the counters to clock up. When the down modifier switch is used it provides a positive logic level to Pin 6 of IC706 but does not provide the positive logic level to IC708 which controls the up/down line. If a positive logic level is not supplied to IC708 to cause Pin 10 of IC705 and IC706 to go high then any clock pulses on Pin 15 of IC705 and IC706 will cause the counters to count down. Therefore when the down modifier switch is used the output of IC710 enables the input of IC711 of the relaxation oscillator, permitting the output of IC712 to cause the 13 hertz clock generator to clock the counter in a down direction.

The modifier is configured so that the maximum voltage it can produce at the output of the buffer will command a maximum up or down vertical speed of 1500 feet per minute. Limit detectors IC714 and IC715 prevent the counters clocking through the extremes of zero or 255 of the eight bit counter. The Pin 7 outputs of counters IC705 and IC706 are connected to IC715. These logic outputs from the counters which are carry up outputs when the counter is counting up, and carry down outputs when the counter counts down are normally high unless the limits of the counter have been reached. If the up/down selector line is low, a bit storage of zero causes Pin 7 of IC705 and IC706 to go low. If the up/down selector line is high causing the counter to count up to a maximum bit storage of 255, Pin 7 of the counter circuits IC705 and IC706 will then also both go to logic low. If both inputs to IC715 are at logic low then the output of IC715 will go low causing the upper input of IC714 to go low and inhibiting clock pulses to the counter. Therefore the counter will simply count to its limit and stop.

In the altitude mode, the digital sample and hold of FIG. 7 is used as a source of an altitude modifier signal, as described above. When altitude mode is engaged, diode D702 provides a positive voltage to capacitor C707, which, in cooperation with resistor R718 provides a positive pulse to Pin 1 of counter circuits IC705 and IC706, presetting the eight bit counter to a count of 128. This provides a 5 volt output from IC709, to the altitude modifier input of the altitude hold and deviation generator 31 of FIGS. 1 and 5, resulting in no altitude deviation, because IC706 in FIG. 5 is referenced to 5 volts. The count of 128 assures that the modifier always starts from the center of its range, so that equal positive and negative change from the selected altitude can be made. When a change in altitude is desired, the up or down modifier switches are closed, causing oscillator 730 to clock the counter of the sample and hold up or down with respect to the initial count of 128, resulting in an output from IC709 which is higher or lower than 5 volts, and therefore modifies the altitude at which the aircraft flies as described above. IC714 and IC715 perform the same function as indicated above, stopping the counter at its extremes. R719 allows C707 to discharge to ground when the altitude mode is disengaged.

Figure 8:
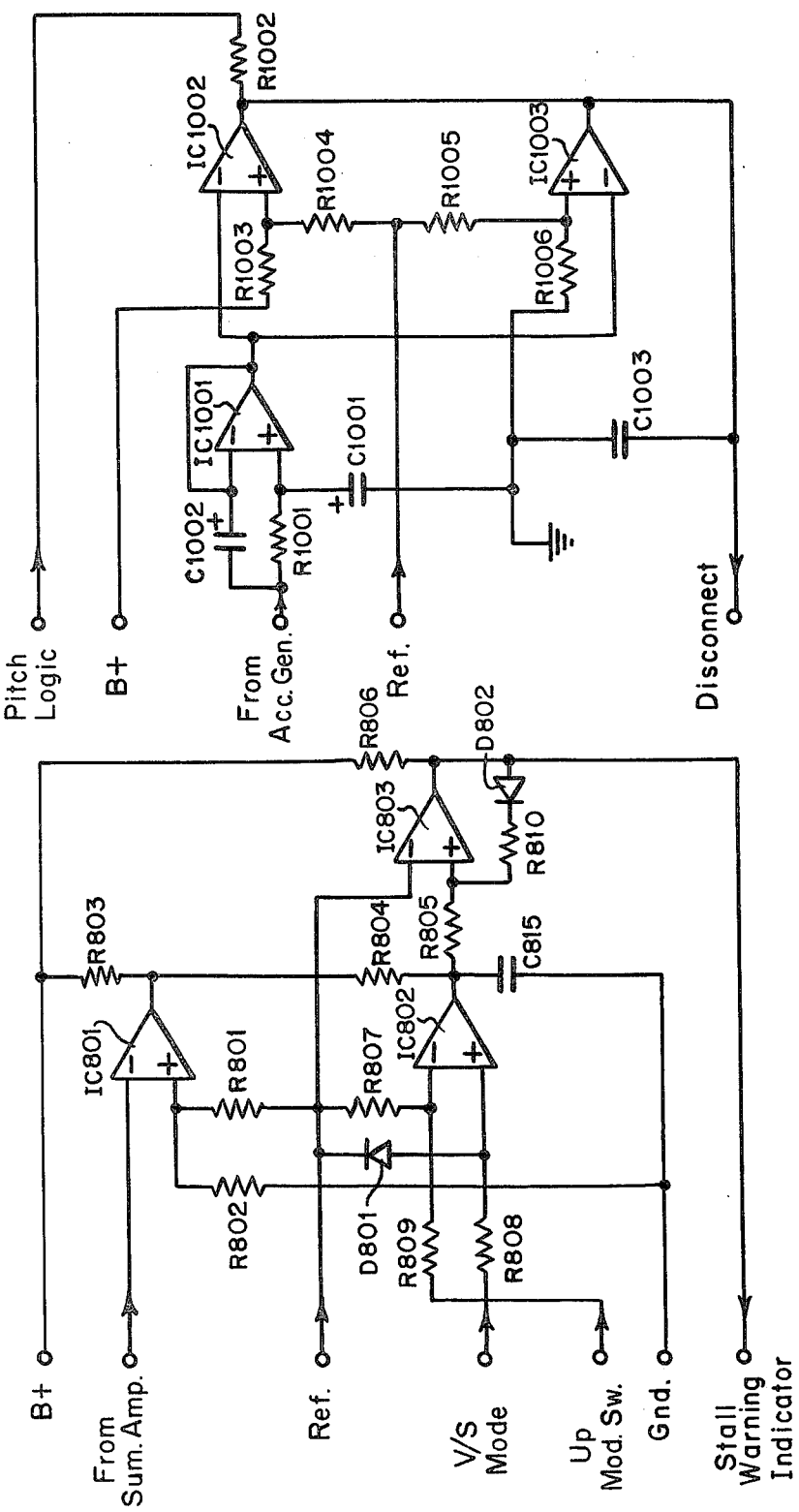
FIG. 8. is a schematic diagram of the stall warning system of FIG. 1.

Referring to FIG. 8, a schematic diagram of the stall warning system 41 of FIG. 1, the output of summing amplifier 35 of FIG. 1 is connected to the reference input of voltage comparator IC801. The other input of IC801 has a bias determined by R801 and R802 which represents approximately the same voltage as a negative 200 foot per minute vertical speed error at the output of the summing amplifier. IC801 and IC802 are comparators of the open collector output kind.

Resistor R803 is connected from B+ to the output of IC801. If the voltage on the reference (−) input of IC801 is greater than the voltage on the signal (+) input of IC801 then the collector is open and capacitor C815 will start to charge toward the supply voltage through R803 and R804. Once it charges to the point where, by means of R805, it pulls the signal input of comparator IC803 above the signal reference voltage supplied to the reference input of IC803 the output of IC803 will go high. The length of time required for this to occur is preferably 15 seconds, determined by values of components of C815, R803 and R804. The positive output of IC803 will then be used to actuate a pilot warning means such as a vertical speed flasher. The pilot can then take corrective action as indicated above.

IC803 is of the same open collector variety as IC801 and IC802, requiring R806, tied to B+, to produce a logic high output.

Since it is desirable that the stall warning system operate only in the vertical speed mode as described above, IC802, in any mode other than vertical speed, has its collector closed, shorting capacitor C815 and preventing it from charging, regardless of the state of IC801. The reference input of IC802 is connected to the reference voltage through resistor R807 as is the signal input of IC802 by diode D801. With no logic inputs, capacitor C815 is effectively shorted to ground. When vertical speed mode is selected the signal input of IC802 is connected to logic high through R808, and goes to a voltage equal to the reference voltage plus the forward voltage drop of diode D801. This opens the collector output of IC802, allowing C815 to charge and permitting the stall warning system to function. As described above, when the up modifier switch is used, logic high is connected to the reference input of IC802, through resistor R809, which causes the output of IC802 to prevent capacitor C815 from charging. Diode D802 and resistor R810 provide some charging current to C815 to assure that the stall warning line remains high once the reference voltage input is exceeded by the voltage to which capacitor C815 is charged, until some corrective action is taken, and capacitor C815 is discharged, for example, by no longer operating in vertical speed mode.

Figure 9:
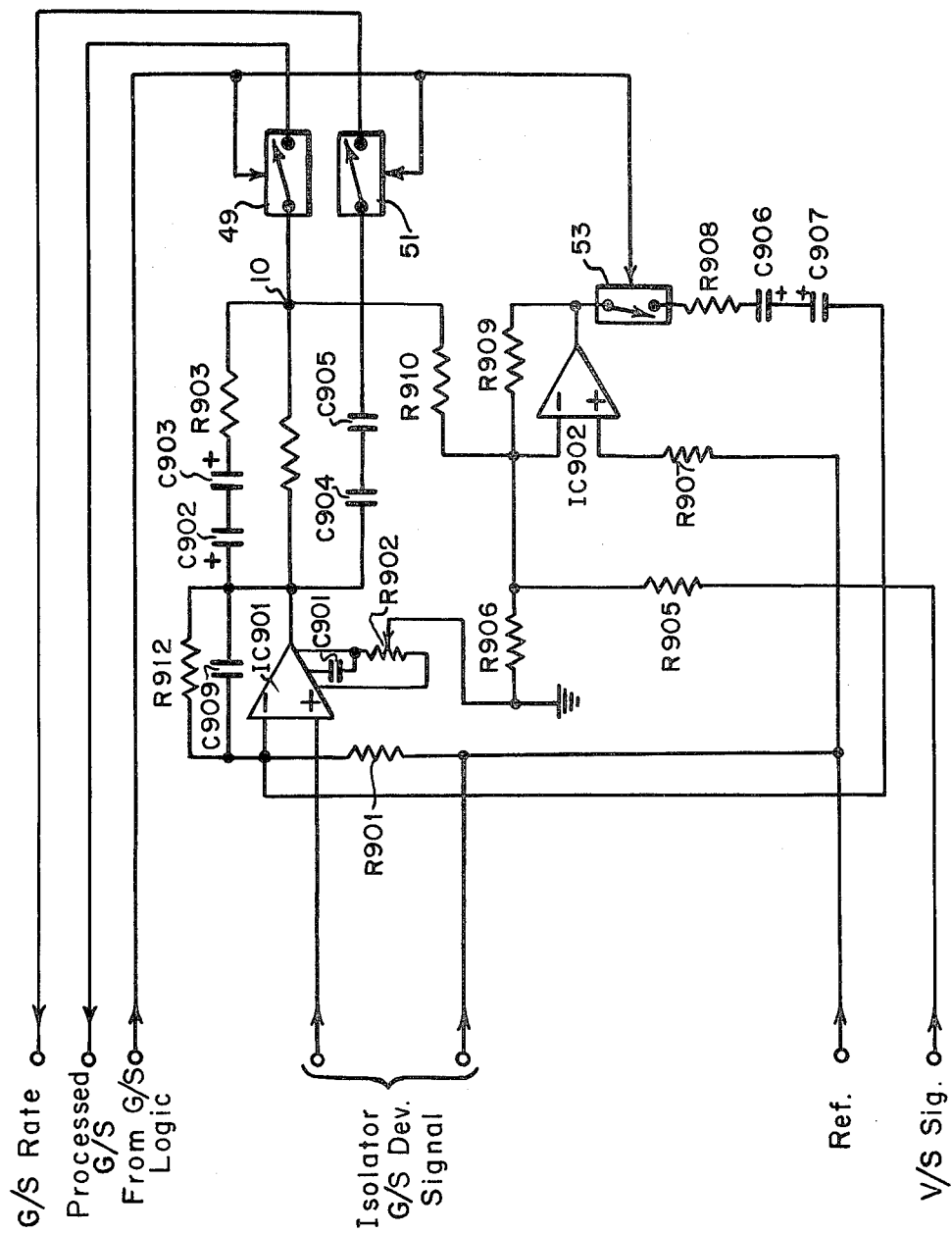
FIG. 9 is a schematic diagram of the glide slope computer, showing the glide slope signal switch and the glide slope rate switch, all of FIG. 1.

Referring to FIG. 9, a schematic of the glide slope computer 43 of FIG. 1, a signal is provided from a radio receiver and navigation converter, which receives a beam-type radio signal transmitted from the ground. When centered on the radio beam this voltage is zero. As the aircraft deviates from the center of the radio beam this voltage is of a magnitude proportional to the angular deviation or the angular error from a nominal glide path descent. The voltage is generally displayed on a visual indicator with a zero center scale meter movement which reaches full scale at 150 millivolts and tells the pilot whether to fly the aircraft up or down to remain on the glide path. This voltage, which may be floating or may be referenced to some unknown DC potential is isolated and referenced to the signal reference level used in the apparatus of the invention as described above.

This isolated glide slope needle position or deviation signal is applied to the non-inverting input of IC901, and is properly referenced by connection to the reference voltage as is the inverting input of IC901 through resistor R901.

The isolated glide slope deviation signal is amplified by IC901 so that a plus or minus 4½ volt output represents full scale deviation of the input (150 millivolts). Resistor R902 is an offset adjust to compensate for any zero offset of IC901 at zero signal input. C901 is a lag compensation capacitor. It provides a very small amount of filtering to the glide slope deviation signal as well as the vertical speed signal, as described below. Resistor R912 provides negative feedback to IC901. Capacitor C909 helps eliminate transients. The output of IC901 is connected to back to back polarized capacitors C902 and C903 in series with R903. This is a rate network which provides a signal proportional to and of a polarity related to rate of motion or rate of deviation from nominal glide slope. R904 is a direct glide slope position mixing resistor. It is effectively in parallel with the C902, C903, R903 rate network. There is an additional rate network made up of C904 and C905 which is switched into use by glide slope rate switch 51, also 51 in FIG. 1. It is provided as an input to the analog computer section of FIG. 11, as described below.

Figure 11:
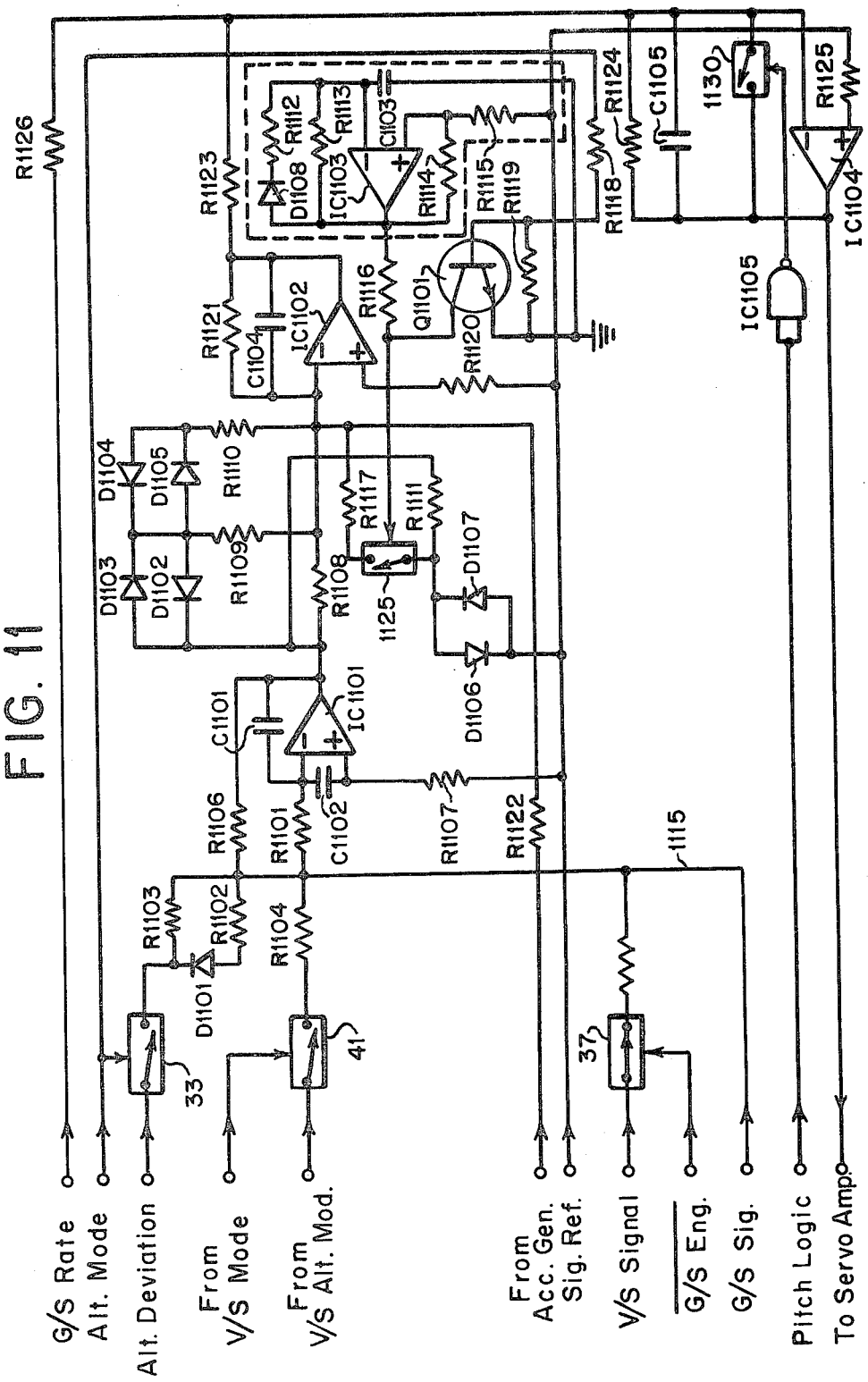
FIG. 11 is a schematic diagram of the summing amplifier, analog computer and servo output amplifier, also including switches 33, 37 and 41, all of FIG. 1.

The ouput signal at summing junction 910 is conducted through glide slope switch 49 when glide slope mode is engaged and switch 49 is closed (also 49 in FIG. 1), to the analog computer which is described in detail in FIG. 11.

One of the other signals that gets mixed in IC901 to provide a glide slope signal is a filtered vertical rate signal from IC902. A vertical speed (or rate of change of altitude) signal which is provided from the rate generator reaches the inverting input of IC902 through resistor R905. This vertical speed signal is provided with an offset by connecting R906 from the inverting input of IC902 to ground thus providing a fixed input bias, which, when the vertical speed is zero, forces the output of IC902 to be of a level consistent with a 500 foot per minute downward vertical speed. This is desirable because a typical vertical speed or rate of descent on the glide path is approximately 500 feet per minute. When that rate of descent is achieved, an equal and opposing current will be provided to the inverting input of IC902 by means of R905, forcing the output of IC902 to be zero relative to bias reference, which is provided to the noninverting input by means of resistor R907. Thus the output of IC902 varies about a reference allowing equal positive and negative output voltage swings relative to the nominal rate of descent. The output of IC902 is also connected through switch 53, closed when glide slope mode is engaged to a high pass or coupling network made up of R908, C906 and C907. This network, having an RC time constant of 11 seconds, couples a medium term time related vertical speed signal to the noninverting input of IC901. Steady state vertical speed signal may not be mixed with glide slope deviation signal because an offset in the glide slope needle position would then be required to compensate for vertical speed that the aircraft achieves in following the glide slope. Therefore it is AC coupled with a long time constant so that at least for purposes of medium term stability vertical speed information is mixed with glide slope position information. This is required to maintain reasonably stable aircraft position with respect to the glide slope. By virtue of this high pass coupling of the vertical rate signal the aircraft can achieve any vertical speed required within limits as described below to fly the glide slope needle (glide slope deviation) signal without error.

IC902 has a gain which causes it to saturate at a vertical speed of plus or minus 500 feet per minute from the nominal rate of descent. If the nominal rate of descent is 500 feet per minute that means the upper limit would be zero vertical speed and the lower limit would be 1000 feet per minute. The inverting input of IC902 is zero volts between the limits of zero and 1000 foot per minute descent because the output of IC902 provides an equal and opposing current to the inverting input by means of feedback resistor R909 to maintain a zero volt differential between the inputs of operational amplifier IC902. Once the saturation point of IC902 is reached, there is no longer an increase in current through R908, and a voltage will be present at the inverting input which is proportional to the vertical speed greater than zero in the up direction, or 1000 feet per minute in the down direction. This voltage, proportional to actual vertical speed beyond these limits, is coupled through R910 and injected at junction 10 to limit the glide slope output signal. Thus if the glide slope needle deviation signal causes the aircraft to fly down it simply continues to rotate and increase vertical speed (if the deviation is sufficient for it to descend at 1000 feet per minute before the glide slope deviation signal causes it to level out) until it reaches a 1000 feet per minute descent. Beyond this rate a direct vertical speed signal is coupled into summing junction 10 and opposes the glide slope command calling for an increased vertical speed. It takes approximately 250 feet per minute beyond the detected limits to cancel the effect of the glide slope needle position signal. Therefore the absolute vertical speed limits on glide slope would be zero plus 250 feet per minute, or actually a climb rate of 250 feet per minute absolute, or a descent rate which would be 1000 plus 250 or 1,250 feet per minute. This maintains the vertical speed within reasonable and comfortable limits when flying a glide slope.

Referring to FIG. 10, a schematic of the disconnect circuit 13 of FIG. 1 is shown in which, IC1 is configured as a voltage follower and buffers the acceleration signal from the acceleration generator circuit. A low pass filter comprised of resistor R1001 and capacitor C1001, filters out very short term variations in the acceleration signal by virtue of a time constant of just under 0.1 seconds. Capacitor C1002 smooths any rapid transient variations in the output of IC1001, which is connected to the signal (+) input of IC1002 and the reference (−) input of IC1003. IC1002 and IC1003 are open collector comparators, as are IC801 and IC802 of FIG. 8.

The pitch logic line input to the disconnect circuit is at logic high only when a pitch axis mode of operation is selected. An OR gate, not shown, located within mode select logic 19 of FIG. 1, provides an output when any of the mode select buttons, which are connected to the OR gate inputs (and also operate electronic latches as described above), are depressed. The output of this OR gate becomes one input of a two input AND gate, also within the mode select logic, and not shown. The other input is a line which is tied to logic high if there is no roll axis autopilot within the aircraft, or goes to high only when the roll axis autopilot is engaged, as required by safety considerations. The output of the AND gate enables the abovementioned electronic latches, which are not responsive to the mode select buttons until these latches receive a logic high output of the AND gate, and will not operate to hold the selected mode logic line high, as described above until such time. When one of these latches does go high it provides an additional input to the abovementioned OR gate to hold its output high, thus holding the output of the AND gate high. The AND gate output serves as the pitch logic signal, provided to the collector output of IC1002 through pull up resistor R1002. It remains high as long as any pitch stabilization mode is selected.

The reference input of IC1002 is connected to a voltage between B+ and reference by virtue of the voltage divider comprised of resistors R1003 and R1004, to a level representative of an upward acceleration of approximately 0.6 g. The signal input of IC1003 is connected to a voltage between ground and reference by virtue of the voltage divider comprised of R1004 and R1005, to a level representative of a downward acceleration of approximately 0.6 g. During normal operation, when accelerations are below the levels mentioned above, the disconnect line is at logic high, by virtue of pull up resistor R1002. When the acceleration exceeds these limits, the output transistor of either IC1001 or IC1002 will turn on, thus pulling the disconnect line to logic zero. It is understood that the circuitry can be modified to respond to for example, an acceleration of 2 g. for longer than 3 seconds by one skilled in the art. Capacitor C1003 smooths transients on this line.

When the disconnect line goes low, a movable gear in the servomechanism gear train associated with the servomechanism which positions the pitch control surfaces of the aircraft, is disengaged. A spring loaded solenoid powered actuator may be used to perform this function, as is well known in the art. The apparatus of the invention may thus be rendered ineffective to control the pitch axis of the aircraft in any mode of operation, and the pilot does not have to fight its operation to manually fly the aircraft. The transition of the disconnect line to logic zero may be used to cancel the selected pitch stabilization mode if supplied to the mode select logic 19 of FIG. 1, or the apparatus may be automatically reengaged when the acceleration has dropped below the limits for a given time interval, by means apparent to one skilled in the art.

As mentioned in discussing the excitation oscillator, a mechanical accelerometer may be used to provide the acceleration signal for the disconnect circuit. It may be of the fixed excited coil type, with a magnetic material supported by a flexible, springy length of sheet metal which moves with respect to the coil during acceleration. The coil may be excited by the output of the amplifier associated with the excitation oscillator, shown in FIG. 3. The acceleration signal output from such mechanical accelerometers must generally be amplified before being applied to the disconnect circuit of FIG. 10. While it is undesirable to use accelerometers to derive pitch stability signals as indicated above, the requirements for the disconnect circuit are not nearly as critical.

Referring to FIG. 11, a schematic of summing amplifier 35 and analog computer 39 of FIG. 1, the means for combining the various command and stability signals used in the manner previously described is illustrated. In altitude mode only, switch 33, also 33 in FIG. 1, is , closed bringing the altitude signal to input resistor R1101 of IC1101 through the network comprised of diode D1101, and resistors R1102 and R1103. Resistor R1101, and capacitors C1101 and C1102 comprise a filter network which eliminates radio frequency interference from the communications transmitter. This filter, only required for some printed circuit board configurations, does not appreciably affect the gain or response time of IC1101.

Resistor R1103 conducts an altitude deviation signal representative of a positive altitude deviation to resistor R1101. When a negative altitude deviation exists, if of sufficient magnitude, diode D1101 will conduct effectively connecting R1102 in parallel with R1103, and providing more gain from IC1101 with respect to this altitude deviation. This will result in more rapid correction of the altitude when it is below the altitude at which it is desired to hold the aircraft.

In the vertical rate mode only, switch 41, also 41 in FIG. 1, is closed connecting the voltage stored by the vertical speed and altitude modifier 29 of FIG. 1 to the input of IC1101, through resistor R1104.

In either altitude or vertical rate modes, switch 37, also 37 in FIG. 1, is closed, connecting the vertical rate signal output of vertical rate generator 9 of FIG. 1 to the input of IC1101 through R1105. Thus actual vertical rate is summed with the stored vertical rate signal at the input of IC1101 in the vertical rate mode, just as altitude deviation is summed with actual vertical rate in the altitude mode.

In glide slope mode only, switch 37 is open. This disconnects the vertical rate signal from the input of IC1101. Instead it is used by the glide slope computer as described above, along with the vertical rate signal to generate a glide slope output, or error signal.

This glide slope signal is now available, due to the closing of switch 49 shown in FIG. 1 and FIG. 9, as an input to IC1101, along line 1115 of FIG. 11.

Resistor R1106 provides negative feedback for operational amplifier IC1101, while resistor R1107 connects the noninverting input to reference.

It will be understood that the analog signals combined by IC1101, a summing amplifier, must be appropriately weighted, by selection of the values of resistors R1103, R1104, R1105 of FIG. 11 and R1104 of FIG. 9, which may easily be accomplished by one skilled in the art. For example, IC1102 has approximately unity gain for actual vertical rate signals. In the preferred embodiment of this invention, these resistors are of the same value for almost all aircraft, while the rate at which the servomechanism changes the position of the pitch control surfaces is varied by appropriate gear ratios. Addition, rather than subtraction of these signals is used because it is appropriate for their polarities as presented to IC1102. It is understood that other methods of combination of these signals, and the acceleration signal, as described below, can be used without departing from the scope of the invention.

The analog signals mixed at the input of IC1101 will appear at the output as an amplified error voltage. It will be proportional to the magnitude of error and will have a polarity with respect to reference indicating direction of error. This error signal, equal to zero only when the aircraft is flying precisely on its command signal, causes the aircraft to rotate in pitch to return to the commanded position. The error signal is supplied to junction 1120, where resistor R1108, and diodes D1102 and D1103 comprise a non-linear gain scaling network to provide an increased rate of rotation which gives a better aircraft response than is obtained by using the direct error voltage coupled through R1108 to the inverting input of summing amplifier IC1102. As the error voltage increases, diode D1102 or D1103, in response to the polarity of error, will become forward biased effectively connecting R1109 in parallel with R1108. If the magnitude of the error increases further, D1104 or D1105 will become forward biased placing R1110 in parallel with R1108 and R1109 to cause a still faster rate of rotation of the aircraft to halt the increase in the magnitude of the error by placing the aircraft at a pitch which flies it back in the correct direction. When very low level error voltages are present the aircraft should rotate very slowly. Then only R1108 will conduct the error signal providing slow rotation.

In the glide slope mode or vertical speed mode (in any mode other than altitude hold) there is an additional path for error signal to be coupled to the input of IC1102, in this case in a pulsed fashion. The error voltage is connected through R1111 to the bottom of switch 25 and to diodes D1106 and D1107 which provide a voltage limiting of the error voltage at switch 25 with respect to reference. For very low level error voltages, the voltage at switch 25 will increase in a manner directly proportional to the error. However, once it exceeds the threshold levels of D1106 and D1107 it is clamped at that point and will not increase further. IC1103 and its associated components, capacitor C1103, diode D1108, and resistors R1112, R1113, R1114 and R1115 comprise a square wave relaxation oscillator (well known in the art) which has a non-symmetrical output. The positive output or logic high of this square wave ocillator is approximately one-ninth the time duration of the negative output. Components are selected to provide a logic high duration of approximately one-tenth of a second and a logic low duration of nine-tenths of a second, for approximately a ten percent duty cycle. This causes switch 25, responsive to the output of IC1103 through resistor R1116, to turn on for approximately a tenth of a second every second, coupling the error voltage through R1117 to the inverting input of IC1102. The ratio of the resistance of the series combination of R1111 and R1116 to that of R1108 is very low. Therefore the pulsed error signal is of high authority for a very short period of time. This aids materially in overcoming hysteresis in the servomechanism. It causes undesirable hunting in the altitude mode. Transistor Q1101 biased into saturation by resistors R1118 and R1119 when the altitude mode line is high, shorts the control input of switch 25 to ground, allowing switch 25 to remain open. The pulsed error signal is thus not supplied in altitude hold mode (altitude mode).

IC1102 has its noninverting input connected to reference by means of resistor R1120. Negative feedback is provided by resistor R1121. Capacitor C1104 filters transients. The acceleration signal from acceleration generator 11 of FIG. 1 is connected by means of resistor R1122 to the inverting input of IC1102. It is thus appropriately weighted and combined with the error signal. The polarities of these signals make summing appropriate. The output of IC1102 is coupled through R1123 to the input of servo amplifier driver IC1104. IC1104 is an inverting buffer with unity gain as a result of equal resistance values of R1123 and feedback resistor R1124. Switch 1130, closed because of the action of IC1105 (wired as an inverter) if a pitch axis mode has not been selected and the pitch logic line is therefore at logic low, provides a zero resistance feedback path for IC1104. In this condition since the inputs of operational amplifier IC1104 must be at equal potentials, and the noninverting input is connected to reference by resistor R1125, a control signal of zero amplitude with respect to reference is fed to the servo amplifier to prevent the motor from running when no pitch axis mode is selected. This is not essential. It merely prevents needless wear of the motor. Capacitor C1105 filters transients at the output of IC1104.

The output of IC1102, in the altitude hold and vertical rate modes constitutes a control signal, which is simply buffered by IC1105 and is provided to the servo amplifier associated with the servomechanism which controls the pitch control surfaces of the aircraft. In the glide slope mode, the glide slope rate signal, produced by the glide slope computer, is also provided by resistor R1126 as an input to IC1104. This results in better control of the aircraft in the glide slope mode, as described above. Resistor R1126 provides appropriate weighting for this signal, which exerts greater authority than the glide slope signal supplied to IC1101 in the glide slope mode, but is of short duration due the capacitive coupling of capacitors C904 and C905 of FIG. 9. The value of R1126 which results in proper weighting is readily determined by one skilled in the art. Summing is the appropriate method of combining the signals because of their polarities.

It is also possible to use the apparatus of the invention to compensate for increases in lift due to extension of aircraft flaps. A means responsive to rate of change of flap position can provide a signal which serves as an additional input to IC1102, thus providing rapid pitch rotation of the aircraft. Conventionally this is accomplished by using elevator trim control surfaces, rather than the primary control surfaces. The success of the application of this additional signal for positioning the primary pitch control surfaces of the aircraft is dependent on the characteristics of the airframe.

In addition an adjustable predetermined stored vertical rate voltage can be provided by a vertical rate instrument, well known in the art. This voltage may be substituted for the stored vertical rate signal, thus flying the aircraft in response to the predetermined vertical speed.

It is understood that the error signal from IC1101 may be suitably filtered and used to operate the vertical axis of a flight director.

The apparatus of the invention may be simplified to operate in a single mode, if desired, by elimination of circuits not needed in that mode. Mode select logic 19 would then not be needed to establish a mode of operation, but some of the circuitry within it, as described above, could be used when required, to assure adequate operation of a simplified one mode system.

While only one embodiment of the invention, together with modifications thereof, has been described in detail herein and shown in the accompanying drawings, it will be evident that various further modifications are possible without departing from the scope of the invention.

What is claimed is:

1. A control apparatus to provide complete control of pitch of an aircraft in response to a command signal, comprising a gyroscopic free device having:
   (a) means for producing an altitude signal responsive to atmospheric pressure;
   (b) means derivative of atmospheric pressure responsive to rate of change of altitude for generating a vertical rate signal;
   (c) means derivative of atmospheric pressure responsive to rate of change of said vertical rate signal for generating a vertical acceleration signal; and (d) means for combining said command signal, said vertical rate signal and said vertical acceleration signal to produce said control signal.

2. The apparatus of claim 1 wherein the means of combining said command signal, said vertical rate signal and said vertical acceleration signal comprises:
   (a) means for combining said vertical rate signal with said command signal to produce an error signal; and
   (b) means for combining said error signal and said vertical acceleration signal to produce said control signal.

3. A control apparatus for providing a control signal to maintain constant aircraft rate of climb or descent to provide complete control of the pitch of an aircraft, comprising a gyroscopic free device having:
   (a) means for producing an altitude signal responsive to atmospheric pressure;
   (b) means derivative of atmospheric pressure for generating a vertical rate signal voltage responsive to rate of change of altitude;
   (c) means for storing the amplitude of said vertical rate signal at a selected vertical rate;
   (d) means derivative of atmospheric pressure responsive to rate of change of said vertical rate signal for generating a vertical acceleration signal; and
   (e) means for combining said vertical rate signal, said stored vertical rate signal amplitude, and said vertical acceleration signal to produce a control signal.

4. The apparatus of claim 3 wherein the means for combining said vertical rate signal, said stored vertical rate signal amplitude and said vertical acceleration signal comprises:
   (a) means for combining said vertical rate signal and said stored vertical rate signal amplitude to produce an error signal; and
   (b) means for combining said error signal and said vertical acceleration signal to produce a control signal.

5. The apparatus of claim 3 or claim 4 wherein the means for storing the amplitude of said vertical rate signal is a digital sample and hold circuit.

6. The apparatus of claim 5 wherein the digital sample and hold comprises:
   (a) an up/down counter means;
   (b) means for providing a clock signal to said counter means to change the count in said counter means;
   (c) a digital to analog converter for converting the count stored in said counter means to an analog voltage;
   (d) a means for comparing the amplitude of said analog voltage to the amplitude of said vertical rate signal to generate an output which determines the direction of count of said counter means whereby the counter means counts in the direction required to change the amplitude of the analog voltage to make it substantially equal to the vertical rate signal amplitude; and
   (e) means for preventing said count stored in said counter means from changing in response to said clock signal until a predetermined time interval has elapsed.

7. The apparatus of claim 4 further comprising warning means responsive to said error signal for warning of a stall condition when said error signal exceeds a predetermined voltage for an interval longer than a predetermined period of time.

8. The apparatus of claim 7 wherein said warning means is responsive to an error signal voltage representing a vertical speed of substantially 200 feet per minute for a period of substantially fifteen seconds.

9. The apparatus of claim 4 further comprising a servomechanism responsive to said control signal for controlling positioning of pitch control surfaces.

10. The apparatus of claim 3 having in addition means for providing a pulsed error signal of increased authority to said means for combining said vertical rate signal, and stored vertical rate signal amplitude, and said vertical acceleration signal, whereby hysteresis in said servomechanism is overcome.

11. A control apparatus for providing a control signal to maintain constant aircraft altitude to provide complete control of the pitch of an aircraft, comprising a gyroscopic free device having:
   (a) means for producing an altitude signal voltage responsive to atmospheric pressure;
   (b) means for storing the amplitude of said altitude signal voltage at a given altitude;
   (c) means derivative of atmospheric pressure for generating a vertical rate signal responsive to rate of change of altitude;
   (d) means derivative of atmospheric pressure for generating a signal responsive to vertical acceleration of said vertical rate signal; and
   (e) means for combining said stored altitude signal voltage amplitude, said altitude signal voltage, said vertical rate signal and said acceleration signal to produce said control signal.

12. The apparatus of claim 11 wherein the means for combining said stored altitude signal voltage amplitude, said altitude signal voltage, said vertical rate signal and said acceleration signal comprises:
   (a) means for combining said stored altitude signal voltage amplitude with said altitude signal voltage to produce an altitude deviation signal;
   (b) means for combining said altitude deviation signal with said vertical rate signal to produce an error signal; and
   (c) means of combining said error signal with said vertical acceleration signal to produce said control signal.

13. The apparatus of claim 11 or claim 12 wherein the means for storing the amplitude of said altitude signal voltage is a digital sample and hold circuit.

14. The apparatus of claim 13 wherein the digital sample and hold comprises:
   (a) an up/down counter means;
   (b) means for providing a clock signal to said counter means to change the count in said counter means;
   (c) a digital to analog converter for converting the count stored in said counter means to an analog voltage; and
   (d) a means for comparing said analog voltage to said altitude signal voltage to generate an output which determines the direction of count of said counter means whereby the counter means counts in the direction required to change the analog voltage to make it substantially equal to the altitude signal voltage; and
   (e) means for preventing said count stored in said counter means from changing in response to said clock signal when it is desired to hold the aircraft at constant altitude.

15. The apparatus of claim 14 wherein the count is constantly changed to provide an analog voltage equal to said altitude signal voltage as the aircraft is flown to various altitudes.

16. The apparatus of claim 12 wherein the means for combining said stored altitude signal voltage amplitude with said altitude signal voltage to produce an altitude deviation signal comprises a summing amplifier.

17. The apparatus of claim 11 or claim 12 further comprising means responsive to said control signal for controlling the position of aircraft pitch control surfaces.

18. The apparatus of claim 12 further comprising means of injecting an analog voltage into the means for combining said stored altitude signal voltage amplitude with said altitude signal voltage whereby the altitude at which the aircraft is maintained is modified in response to said injected voltage.

19. The apparatus of claim 11 further comprising a voltage source to supply a reference voltage to the means for combining signals.

20. A control apparatus for providing a control signal to maintain aircraft rate of descent on a glide path and to provide complete control of the pitch of the aircraft, comprising a gyroscopic free device having:
 (a) means for producing an altitude signal responsive to atmospheric pressure;
 (b) means derivative of atmospheric pressure for generating a vertical rate signal responsive to rate of change of altitude;
 (c) means derivative of atmospheric pressure for generating a signal responsive to vertical acceleration from said vertical rate signal;
 (d) means for acquiring an isolated glide slope needle position signal from a navigational receiver; and
 (e) means of combining said vertical rate signal, said needle position signal and said acceleration signal to produce said control signal.

21. The apparatus of claim 20 wherein the means of combining said vertical rate signal, said needle position signal and said acceleration signal comprises:
 (a) means of combining said vertical rate signal and said needle position signal to produce an output signal; and
 (b) means for combining said output signal and said vertical acceleration signal to produce a control signal.

22. The apparatus of claim 20 or claim 21 further comprising means for limiting the rate of descent or ascent of the aircraft between preset limits.

23. The apparatus of claim 22 wherein the means for limiting the rate of descent or ascent is an amplifier which saturates when the rate exceeds preset limits.

24. The apparatus of claim 23 wherein the rate of ascent is limited to 250 feet per minute and the rate of descent is limited to 1250 feet per minute.

25. The apparatus of claim 1 or claim 2 or claim 3 or claim 4 or claim 11 or claim 12 or claim 20 or claim 21 wherein the means for generating a signal responsive to vertical speed from said altitude signal comprises a differentiator.

26. The apparatus of claim 1 or claim 2 or claim 3 or claim 4 or claim 11 or claim 12 or claim 20 or claim 21 wherein the means for generating a signal responsive to vertical acceleration from said vertical speed signal comprises a differentiator.

27. The apparatus of claim 1 or claim 2 or claim 3 or claim 4 or claim 11 or claim 12 or claim 20 or claim 21 wherein the altitude signal is linear with altitude.

28. The apparatus of claim 27 wherein the altitude signal is linearized by a stepped linearizer.

29. The apparatus of claim 28 wherein the stepped linearizer is comprised of a series of input resistors which are connected to alter the gain of an amplifier as altitude changes.

30. The apparatus of claim 20 further comprising a servomechanism responsive to said control signal for controlling positioning of pitch control surfaces.

31. The apparatus of claim 30 having in addition means for providing a pulsed output signal of increased authority to said means for combining said output signal and said vertical acceleration signal, whereby hysteresis in said servomechanism is overcome.

32. The apparatus of claim 1 or claim 3 or claim 11 or claim 20 wherein the means for combining signals comprises a summing amplifier.

33. The apparatus of claim 1 or claim 3 or claim 11 or claim 20 or claim 30 further comprising a voltage source to supply a reference voltage to the means for combining signals.

34. A control apparatus for completely controlling the pitch of an aircraft in response to a command signal, comprising a gyroscopic free device having:
 (a) means for producing an altitude signal responsive to atmospheric pressure;
 (b) means derivative of atmospheric pressure for generating a vertical rate signal responsive to rate of change of altitude;
 (c) means derivative of atmospheric pressure for generating from said vertical rate signal a vertical acceleration signal; and
 (d) means responsive to said vertical acceleration signal for rendering the pitch control apparatus ineffective to control the pitch of the aircraft when said vertical acceleration signal exceeds a preset amplitude.

35. An apparatus for providing a control signal to maintain constant rate of climb or descent by controlling the pitch of an aircraft comprising:
 (a) means for producing an altitude signal responsive to atmospheric pressure;
 (b) means for generating a vertical rate signal voltage responsive to rate of change of altitude;
 (c) a digital sample and hold circuit for storing the amplitude of said vertical rate signal at a selected vertical rate including;
  i. an up/down counter means;
  ii. means for providing a clock signal to said counter means to change the count in said counter means;
  iii. a digital-to-analog converter for converting the count stored in said counter means to an analog voltage;
  iv. a means for comparing the amplitude of said analog voltage to the amplitude of said vertical rate signal to generate an output which determines the direction of count of said counter means whereby the counter means counts in the direction required to change the amplitude of tha analog voltage to make it substantially equal to the vertical rate signal amplitude; and
  v. means for preventing said count stored in said counter means from changing in response to said clock signal until a predetermined time interval has elapsed;

(d) means responsive to rate of change of said vertical rate signal for generating a vertical acceleration signal;

(e) means for combining said vertical rate signal, said stored vertical rate signal amplitude, and said vertical acceleration signal to produce a control signal;

(f) a low frequency clock; and (g) means for connecting said low frequency clock to said counter means for an interval of time to alter the count stored in said counter means whereby the vertical rate is changed.

36. The apparatus of claim 35 wherein said interval of time during which said low frequency clock is connected to said counter means is manually determined.

37. An apparatus for providing a control signal to maintain constant aircraft rate of climb or descent by controlling the pitch of an aircraft comprising:

(a) means for producing an altitude signal responsive to atmospheric pressure;

(b) means for generating a vertical rate signal voltage responsive to rate of change of altitude;

(c) means for storing the amplitude of said vertical rate signal at a selected vertical rate;

(d) means responsive to rate of change of said vertical rate signal for generating a vertical acceleration signal;

(e) means for combining said vertical rate signal, said stored vertical rate signal amplitude, and said vertical acceleration signal to produce a control signal including:

(i) means for combining said vertical rate signal and said stored vertical rate signal amplitude to produce an error signal; and (ii) means for combining said error signal and said vertical acceleration signal to produce a control signal;

(f) stall warning means responsive to said error signal for warning of a stall condition when said error signal exceeds a predetermined voltage for an interval longer than a predetermined period of time, said stall means including:

(i) a voltage comparator having an output signal responsive to a comparison of the error signal and the predetermined voltage, said output signal going to a high state when the error signal exceeds the predetermined voltage;

(ii) means for integrating the output of said comparator; and (iii) means for determining when the integration exceeds a predetermined value.

38. An apparatus for providing a control signal to maintain constant aircraft altitude by controlling the pitch of an aircraft comprising:

(a) means for producing an altitude signal voltage responsive to atmospheric pressure;

(b) means for storing the amplitude of said altitude signal voltage at a given altitude;

(c) means for generating a vertical rate signal responsive to rate of change of altitude;

(d) means of generating a signal responsive to vertical acceleration from said vertical rate signal;

(e) means for combining said stored altitude signal voltage amplitude, said altitude signal voltage, said vertical rate signal and said acceleration signal to produce said control signal including:

(i) means for combining said stored altitude signal voltage amplitude with said altitude signal voltage to produce an altitude deviation signal;

(ii) means for combining said altitude deviation signal with said vertical rate signal to produce an error signal; and (iii) means of combining said error signal with said vertical acceleration signal to produce said control signal;

(f) means of injecting an analog voltage into the means for combining said stored altitude signal voltage amplitude with said altitude signal voltage whereby the altitude at which the aircraft is maintained is modified in response to said injected voltage, said means of injecting including;

(i) a low frequency clock;

(ii) an up/down counter;

(iii) means for causing the counter to count in response to an up/down command for an interval of time; and (iv) means for converting the count stored in said counter to said analog voltage.

39. The apparatus of claim 38 wherein the interval of time is manually determined.

40. An apparatus for providing a control signal to maintain aircraft rate of descent on a glide path by controlling the pitch of the aircraft comprising:

(a) means for producing an altitude signal responsive to atmospheric pressure;

(b) means for generating a vertical rate signal responsive to rate of change of altitude;

(c) means for generating a signal responsive to vertical acceleration from said vertical rate signal;

(d) means for acquiring an isolated glide slope needle position signal from a navigational receiver; and (e) means of combining said vertical rate signal, said needle position signal and said acceleration signal to produce said control signal including:

(i) means of combining said vertical rate signal and said needle position signal to produce an output signal including:

(aa) means for filtering out long-term variations in said vertical rate signal;

(bb) a summing amplifier for producing a sum signal of said filtered vertical rate signal and said needle position signal;

(cc) a rate network for producing a first rate signal proportional to the rate of change of said sum signal; and (dd) means for combining said sum signal and said rate signal to produce said output signal;

(ii) means for combining said output signal and said vertical acceleration signal to produce a control signal.

41. The apparatus of claim 40 wherein the means for combining said sum signal and said first rate signal constitutes a summing junction.

42. The apparatus of claim 40 wherein the first rate signal is of limited authority.

43. The apparatus of claim 40 further comprising a second rate network for producing a second rate signal of greater authority and shorter duration than said first rate signal, said second rate signal being combined with said output signal and said acceleration signal to produce a control signal.

* * * * *